United States Patent [19]

Shimada et al.

[11] Patent Number: 5,546,375
[45] Date of Patent: Aug. 13, 1996

[54] METHOD OF MANUFACTURING A TIP FOR SCANNING TUNNELING MICROSCOPE USING PEELING LAYER

[75] Inventors: Yasuhiro Shimada, Atsugi; Yoshimasa Okamura, Tokyo; Osamu Takamatsu; Masaru Nakayama, both of Atsugi; Yoshihiro Yanagisawa, Isehara, all of Japan

[73] Assignee: Canon Kabushiki Kaisha, Tokyo, Japan

[21] Appl. No.: 555,503

[22] Filed: Nov. 8, 1995

Related U.S. Application Data

[63] Continuation of Ser. No. 75,382, Jun. 14, 1993, abandoned.

[30] Foreign Application Priority Data

Jul. 15, 1992 [JP] Japan .................................. 4-209426
Nov. 11, 1992 [JP] Japan .................................. 4-324605

[51] Int. Cl.$^6$ ........................................................ G11B 9/00
[52] U.S. Cl. ......................... 369/126; 250/306; 156/631.1; 156/647.1; 437/228
[58] Field of Search ........................... 29/25.35; 369/126; 250/306, 307; 156/631, 633, 647, 657, 659.1, 662, 629; 437/228

[56] References Cited

U.S. PATENT DOCUMENTS

| | | | |
|---|---|---|---|
| 4,846,931 | 7/1989 | Gmitter et al. | 156/633 |
| 4,916,002 | 4/1990 | Carver | 428/139 |
| 5,073,230 | 12/1991 | Maracas et al. | 156/631 |
| 5,116,462 | 5/1992 | Bartha et al. | 156/643 |
| 5,166,520 | 11/1992 | Prater et al. | 250/306 |
| 5,221,415 | 6/1993 | Albrecht et al. | 156/629 |
| 5,272,913 | 12/1993 | Toda et al. | 73/105 |
| 5,396,066 | 3/1995 | Ikeda et al. | 250/306 |

FOREIGN PATENT DOCUMENTS

| | | | |
|---|---|---|---|
| 63-161552 | 7/1988 | Japan | G11B 9/00 |
| 3-135702 | 6/1991 | Japan . | |

OTHER PUBLICATIONS

Physical Review Letters, vol. 49, No. 1, G. Binning et al., "Surface Studies by Scanning Tunneling Microscopy.", pp. 57–61.
Journal of Vacuum Science & Technology A, vol. 8, No. 1, Jan./Feb. 1990, E. E. Ehrichs et al., "Etching of Silicon (III) With The Scanning Tunneling Microscope.", pp. 571–573.
Micro Electric Mechanical Systems, Feb. 11–14, 1990, C. F. Quate, Gintzon Laboratory, "Imaging With The Tunneling & Force Microscope.", pp. 188–191.
Applied Physics Letters, Jul. 27, 1987, vol. 51, No. 4, U. Staufer et al., "Nanometer Scale Structure Fabrication With the Scanning Tunneling Microscope.", pp. 244–246.
Applied Physics Letters, vol. 53, No. 24, Dec. 12, 1988, H. Heinzelmann et al., "Topography and Local Modification of the $HoBa_2Cu_3 O_{7-x}(001)$ Surface Using Scanning Tunneling Microscopy.", pp. 2447–2449.

Primary Examiner—David C. Nelms
Assistant Examiner—Andrew Q. Tran
Attorney, Agent, or Firm—Fitzpatrick, Cella, Harper & Scinto

[57] ABSTRACT

After a recessed portion 2 is formed in a first substrate made of single crystal silicon by crystal axis anisotropic etching, a peeling layer and a material of a fine tip which may be a noble metal or a noble metal alloy are formed. A second substrate is joined to the fine tip, and peeling is performed on the peeling layer, whereby the fine tip is formed on the second substrate.

23 Claims, 16 Drawing Sheets

5,546,375

METHOD OF MANUFACTURING A TIP FOR SCANNING TUNNELING MICROSCOPE USING PEELING LAYER

This application is a continuation of application Ser. No. 08/075,382 filed Jun. 14, 1993, now abandoned.

BACKGROUND OF THE INVENTION

1. Field of the Invention

The present invention relates to a fine tip and a probe unit which are used in, for example, tunneling current detecting apparatuses, minute force detecting apparatuses and scanning tunneling microscopes, as well as a method of manufacturing such fine tip and probe unit.

Furthermore, the present invention relates to a scanning tunneling microscope which employs the probe unit and a data processing apparatus which performs recording, reproduction or erasure of data using the procedures of the scanning tunneling microscope.

2. Description of the Related Art

In recent years, scanning tunneling microscopes (hereinafter referred to as STMs) capable of directly observing the electron structure of the surface atom of a conductor have been developed (G. Binning et al., Phys. Rev. Lett. 49 (1982) 57), and thus the real space image of the surface structure can be measured at a very high resolution (which is in the order of a nanometer or less) regardless of a single crystalline or amorphous substance. Such STMs utilize the flow of a tunneling current between a metal tip (probe) and a conductive substance which occurs when a voltage is applied therebetween and the metal tip is moved to a distance about 1 nm from the conductive substance. Since this tunneling current is very sensitive to changes in the distance between the metal tip and the conductive substance, and changes exponentially as the distance changes, the surface structure of the real space can be observed at an atomic-scale lateral resolution by scanning the tip in such a manner that the tunneling current is maintained constant. Although such an analysis employing the STM has been limited to conductive materials heretofore, the structural analysis of a thin insulating film formed on the surface of a conductive material is now being done. Also, since the above-described apparatus or means employs a method of detecting a fine current, it has an advantage in that it can observe the medium at low power without damaging it. Also, the above-described apparatus or means is capable of operating in the atmosphere. Thus, an expansion of the STM application is to be anticipated in the near future.

For example, research has been done on the application of the STM techniques to the observation/evaluation of the semiconductor or polymer material at an atomic-scale lateral resolution, to fine processing (E. E. Ehrichs, Proceedings of 4th International Conference on Scanning Tunneling Microscope/Spectroscopy, '89, S13-3) and to recording apparatuses.

Particularly in the field of computer or video data, there has been an increasing demand for large-capacity recording apparatuses. Further, since advances in the semiconductor processing technologies have reduced the size of microcomputers and improved their computational ability, a small recording apparatus has been demanded.

In order to fulfil these requirements, a recording/reproducing apparatus has been proposed, which performs recording or writing of data by changing the work function of the surface of a recording medium. This is achieved by applying a voltage from a transducer comprising a tunneling current generating probe which is present on a driving means at a distance from the recording medium which can be finely adjusted, and which performs reading out of data by detecting changes in the tunneling current caused by changes in the work function.

The STM probe to be employed in the recording/reproducing apparatus has been proposed by, for example, Quate et al of Stanford University. This STM probe employs a fine displacement element (IEEE Micro Electric Mechanical Systems, pp. 188–199, Feb. 1990), and forms a bimorph cantilever in which electrodes and thin piezoelectric films are formed on an open portion formed in a silicon substrate using a known photolithographic process and known film forming and etching technologies. A fine tip for detecting tunneling current is mounted on the free end portion of the upper surface of this cantilever, thereby obtaining excellent STM images.

In order to achieve the surface observation at an atomic- or molecular-scale resolution or a high recording density, the radius of curvature of the distal end portion of the fine tip must be small. Also, from the viewpoint of improving the functioning of a recording/reproducing system, particularly, from the viewpoint of increasing the recording/reproducing speed, simultaneous driving of a large number of tips (a multiprobe) has been proposed. Thus, the plurality of fine probes on the same substrate must have the uniform characteristics, e.g., the same height or the same distal end radius of curvature.

Conventionally, such fine tips are formed by silicon anisotropic or isotropic etching using the semiconductor manufacturing process (such method being disclosed in Japanese Patent Laid-Open No. hei 3-135702). In this fine tip forming method, a trench 114 is first formed in a single crystal silicon 111 by anisotropic or isotropic etching, as shown In FIG. 15. Next, $SiO_2$ 113 or another substance, such as C, SiN or SiC, is coated on the entire surface of the single crystal silicon 111 using the trench 114 as a female die. After the coated film has been patterned in the form of a cantilever 115, the silicon located below the cantilever is removed by etching to obtain a cantilever-shaped probe 116.

Alternatively, as shown in FIG. 16(a), a thin film formed on a substrate 121 is patterned in a circular form, and the substrate is etched using the circular thin film as a mask 122. A tip 123 is formed utilizing the side etching. Alternatively, as shown in FIG. 16(b), a conductive material is deposited obliquely on an inversely tapered resist open portion 124 while a substrate 121 is being rotated, and a tip 123 is formed by the lift-off method.

However, the conventional fine tip manufacturing method shown in FIG. 15 has the following problems:

(1) Since the silicon substrate which acts as the female die of the cantilever-shaped probe is removed by etching in a subsequent process, productivity is reduced and production costs increased.

(2) In an STM probe which is formed by coating a conductive material on the cantilever-shaped probe, coating on the sharp distal end portion of the probe is difficult, making provision of an STM which can stably handle a fine tunneling current difficult.

(3) Since that portion of the single crystal Si, in which a trench is formed, is removed by etching, it is difficult to form an interconnection used to transmit a detection signal obtained by detecting a tunneling current to an amplifying or processing portion.

In the conventional fine tip manufacturing methods shown in FIG. 16, it is difficult to maintain fixed resist patterning conditions or fixed material etching conditions, making it difficult to form a plurality of fine tips having a fixed height or an accurate distal end radius of curvature.

SUMMARY OF THE INVENTION

A primary object of the present invention is to provide a method of manufacturing a fine tip and a probe unit which assures an increase in productivity and a reduction in the production costs, enables a sharp distal end to be formed and enables a uniform shape to be maintained, as well as a probe unit which employs such a fine tip.

Another object of the present invention is to provide a scanning tunneling microscope and a data processing apparatus which include the probe unit obtained by the manufacturing method described below.

According to a method of manufacturing a fine tip provided in a first aspect of the present invention, a peeling layer is formed on a first substrate in which a recessed portion is formed, and then a fine tip material is laminated on the peeling layer to form a fine tip. Thereafter, the fine tip portion is joined to a second substrate, and then peeling is performed at the peeling layer to transfer the fine tip portion onto the second substrate, whereby a fine tip is manufactured. Thus, the first substrate in which the recessed portion is formed can be used repeatedly. This improves productivity and reduces the production costs.

That is, the present invention provides in the first aspect thereof the method of manufacturing a fine tip for detecting a tunneling current or minute force which comprises at least the following steps of:

(a) forming a recessed portion in a surface of a first substrate;
(b) forming a peeling layer on the first substrate containing the recessed portion;
(c) laminating a fine tip material on the peeling layer containing the recessed portion to form a fine tip;
(d) joining the fine tip on the peeling layer containing the recessed portion to a second substrate; and
(e) performing peeling on an interface between the peeling layer and the first substrate or between the peeling layer and the fine tip to transfer the fine tip onto the second substrate.

The present invention further provides a fine tip manufactured by the above-described manufacturing method.

According to a method of manufacturing a probe unit provided in a second aspect of the present invention, first a fine tip material and then a piezoelectric element material are formed on a single crystal substrate in which a recessed portion is formed by crystal axis anisotropic etching. Thereafter, the substrate is processed to form a cantilever consisting of a fine tip and a piezoelectric element on the substrate, whereby a probe unit is manufactured. Thus, the recessed portion serving as a female die of the fine tip has a sharp distal end. Accordingly, a plurality of fine tips are formed on the same substrate, each having a uniform shape. This enables the provision of a probe unit exhibiting the same characteristics.

That is, the present invention provides in the second aspect thereof the method of manufacturing a probe unit in which a cantilever including a fine tip for detecting a tunneling current or minute force and a piezoelectric element for displacing the fine tip is formed on a single crystal substrate, which comprises at least the following steps of:

(a) forming a recessed portion in a surface of the single crystal substrate by crystal axis anisotropic etching;
(b) laminating a fine tip material on the single crystal substrate containing the recessed portion to form a fine tip;
(c) forming plurality of electrodes and plurality of piezoelectric layers which constitute the piezoelectric element on the fine tip on the single crystal substance containing the recessed portion; and
(d) performing crystal axis anisotropic etching on the single crystal substrate to form a cantilever including the fine tip and the piezoelectric element on the substrate.

The present invention further provides a probe unit which is manufactured by the above-described manufacturing method.

The present invention provides in a third aspect thereof a scanning tunneling microscope and a data processing apparatus which comprise the probe unit provided in the second aspect of the present invention, a driving means for displacing the probe unit, control means for controlling the driving means, means for adjusting a distance between the probe and a sample medium to be observed or a recording medium, and means for applying a voltage between the probe and the medium. In the data processing apparatus, the voltage application means is pulse voltage application means or bias voltage application means. In the scanning tunneling microscope or data processing apparatus, the control means changes a bias voltage which displaces the cantilever on the basis of the results of detection of a tunneling current which flows between the medium and the probe, and applies the obtained signal to an electrode constituting the cantilever. In the data processing apparatus, the recording medium has an electric memory effect or has a non-conductive surface.

Other objects and advantages of the invention will become apparent during the following discussion of the accompanying drawings.

BRIEF DESCRIPTION OF THE DRAWINGS

FIG. 10, comprising

DETAILED DESCRIPTION OF THE PREFERRED EMBODIMENTS

The present invention will be described below with reference to the accompanying drawings.

FIG. 1, comprising FIGS. 1(a) through 1(e), illustrates the major processes of a fine tip manufacturing method provided in the first aspect of the present invention.

Figure 1A:
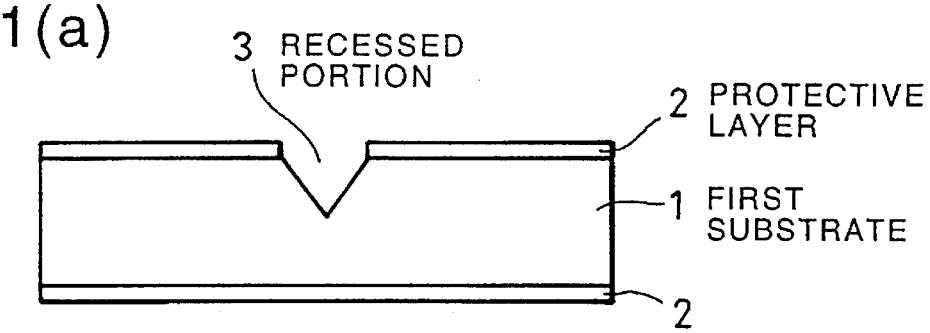
FIG. 1, comprising FIGS. 1(*a*), 1(*b*), 1(*c*), 1(*d*) and 1(*e*), illustrates examples of the major processes of a fine tip manufacturing method provided in the first aspect of the present invention.

In FIG. 1(a), a first substrate 1 is prepared first. The first substrate 1 is made of a material on which crystal axis anisotropic etching can be conducted, such as single crystal silicon or a GaAs semiconductor.

Subsequently, a protective layer 2 is formed on each of the two surfaces of the first substrate 1. Any material can be used as the protective layer 2 as long as it can withstand the etchant of the crystal axis anisotropic etching which is conducted on the first substrate 1 in a subsequent process. Thereafter, a desired site of the protective layer 2 is removed by photo etching to expose the surface of the first substrate 1, and then the first substrate 1 is subjected to the crystal axis anisotropic etching to form an inverted pyramid-shaped recessed portion 3.

Figure 1B:
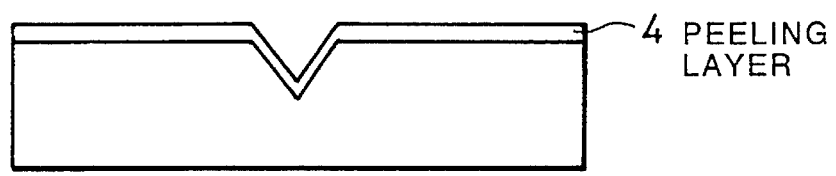

Next, as shown in FIG. 1(b), a peeling layer 4 is formed on the first substrate containing the recessed portion 3. The peeling layer 4 is used to peel a fine tip in a subsequent process, and must therefore be made of an appropriate material. Where peeling is performed on the interface between the first substrate 1 and the peeling layer 4, a material which does not adhere well to the first substrate 1 must be selected. Where peeling is performed on the interface between the peeling layer 4 and the fine tip, a material which does not adhere well to the fine tip must be employed.

Figure 1C:
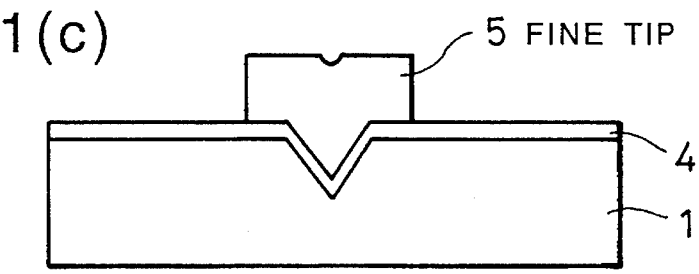

Next, as shown in FIG. 1(c), a fine tip material is formed on the first substrate 1 containing the recessed portion 3, and the formed material is patterned to form a fine tip 5. A highly conductive metal material must be employed as the material of the fine tip 5. A more preferable material is a noble metal or noble metal alloy.

The use of such a material assures an STM probe which exhibits excellent reproducibility and stable characteristics.

Figure 1D:
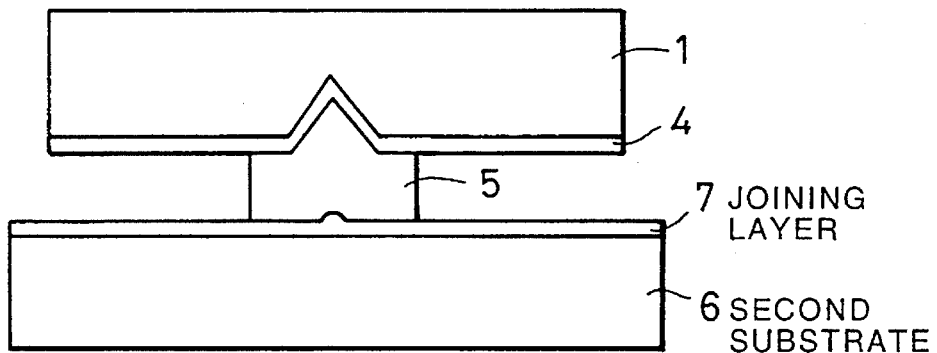

Subsequently, as shown in FIG. 1(d), a joining layer 7 formed on a second substrate 1 is joined to the fine tip 5 formed on the first substrate 1. Joining is performed by intermetallic joining or anode joining. If such a joining method is utilized in STM, since an extension electrode is required, it is desirable that a joining layer 7 made of a metallic material be used.

Figure 1E:
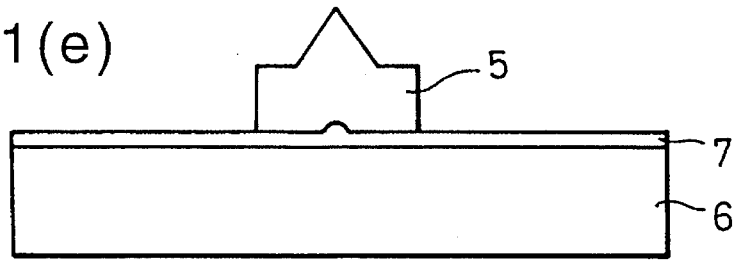

Next, as shown in FIG. 1(e), the fine tip 5 is transferred onto the second substrate by performing peeling on the interface between the first substrate 1 and the peeling layer 4 or between the peeling layer 4 and the fine tip 5, whereby a fine tip is manufactured. Where peeling is performed on the interface between the first substrate 1 and the peeling layer 4, the peeling layer 4 on the fine tip 5 must be removed.

The protective layers 2, the peeling layer 4, the fine tip 5 and the joining layer 7 are formed by using the known technologies including the thin-film manufacturing technologies, such as the vacuum deposition process, sputtering and chemical vapor deposition, the photolithographic process and etching. The present invention is not limited by the manufacturing method.

In the first aspect of the present invention, a cantilever type probe can be readily manufactured by forming a cantilever layer on the second substrate beforehand.

Further, a probe unit capable of separately driving fine tips can be readily manufactured by forming beforehand a cantilever layer having an actuator capable of uni-axial, bi-axial or tri-axial drive on the second substrate.

Furthermore, a probe unit capable of transmitting a signal obtained by detecting a tunneling current or the like can be readily manufactured by forming a signal processing circuit element, containing interconnections and transistors, on the second substrate beforehand.

Figure 9:
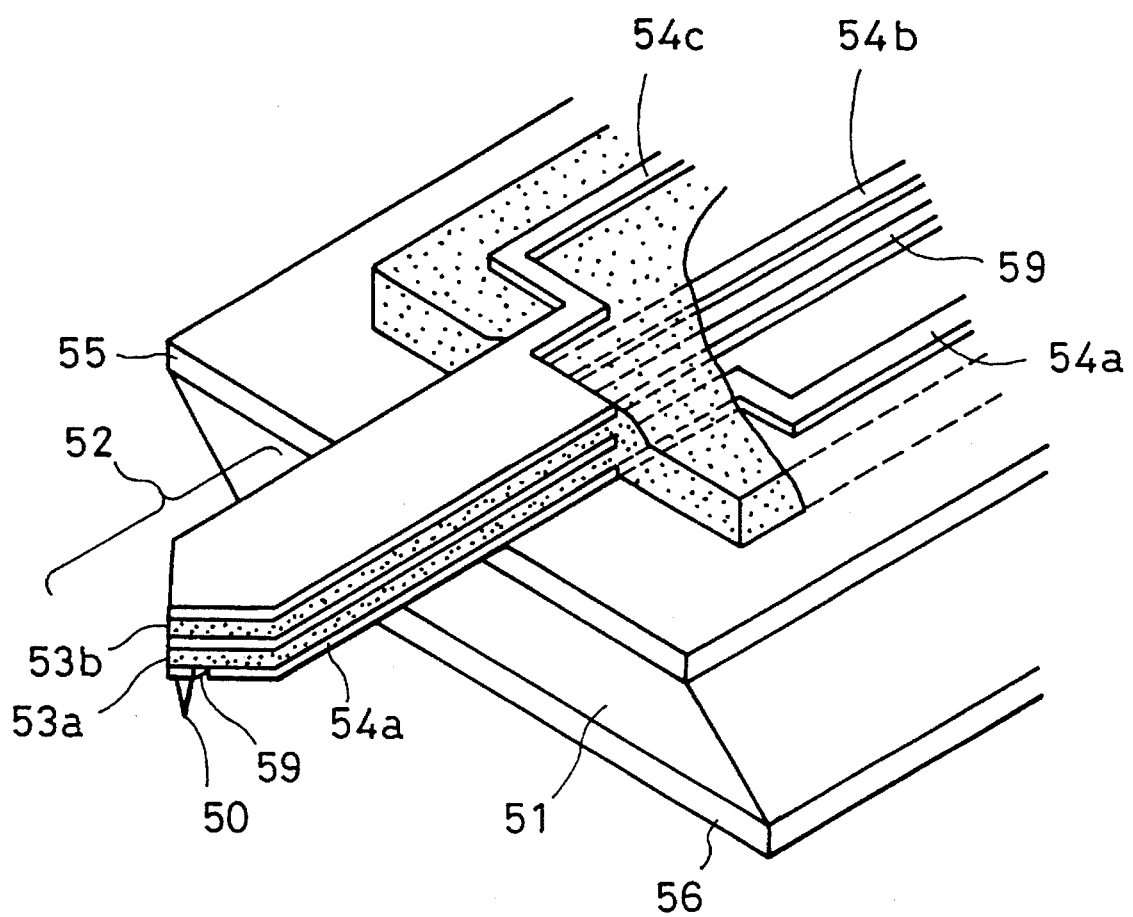
FIG. 9 is a perspective view of an example of a probe unit provided in the second aspect of the present invention.

FIG. 9 is a perspective view of a probe unit provided in the second aspect of the present invention. In the cantilever type probe provided in the second aspect of the present invention, a cantilever 52 having a piezoelectric bimorph or unimorph or other driving means is disposed on an open portion formed in a single crystal substrate 51 (FIG. 9 shows an example which employs a piezoelectric bimorph), and a tunneling current tip 50 is provided on the distal end portion of the cantilever 52.

In the case of a piezoelectric bimorph driving, electrodes 54a, 54b and 54c are laminated on the cantilever 52 in order to apply a voltage to piezoelectric members 53a and 53b. In this way, the cantilever 52 is operated as the piezoelectric element, whereby the tunneling current tip 50 is moved for scanning.

The tip 50 at the distal end of the cantilever is manufactured by forming a recessed portion in the surface of a single crystal substrate by crystal axis anisotropic etching and then by depositing a conductive material on the recessed portion.

The manufacturing processes of the probe unit provided in the second aspect of the present invention, shown in FIG. 9, will be described below with reference to FIG. 10.

First, masking layers 55 and 56 are formed on a silicon (100) substrate 51, and the masking layer 55 formed on the front surface of the substrate 51 is patterned in a circular or square form to form an etching open portion 57. Thereafter, the silicon is etched in an inverted pyramid shape by crystal axis anisotropic etching to form a recessed portion 58 (see FIG. 10(a)). Next, the masking layer 55 on the front surface of the substrate is removed. After a similar masking layer 55 is formed, a conductive material is formed on the masking layer 55 to form a portion which serves as a lower electrode 54a, a tunneling current tip 50 and an interconnection 59 for tunneling current (see FIG. 10 (b)). Next, a driving portion including piezoelectric members 53a and 53b and electrodes 54b and 54c is formed (see FIG. 10 (c)). Thereafter, a back etching open portion 60 is formed in the masking layer 56 on the rear surface of the substrate. After the surface of the substrate is sealed, the silicon substrate 51 is removed by crystal axis anisotropic etching to form a membrane of the front masking layer 55. Finally, the front masking layer 55 is etched from the rear surface of the substrate to form a cantilever 52 (see FIG. 10 (d)).

In the crystal axis anisotropic etching of single crystal silicon which employs an alkali etchant, the etch rate of the silicon (111) plane is substantially zero. Therefore, the recessed portion formed by such a method has a pyramid-like shape which is surrounded by the silicon (111) equivalent plane, and the depth thereof is determined by the shape and size of the etching mask. Also, the angle of the distal end is uniform no matter what shape the mask has. It is therefore possible to form a plurality of tips having the uniform shape on a substrate.

The method of manufacturing a piezoelectric element which includes piezoelectric layers and electrode layers employs the known film-forming technologies, such as the photolithographic process, the vacuum deposition process and sputtering. The present invention is not limited by the employed technologies.

In the probe unit provided in the second aspect of the present invention, an amplifier for amplifying a tunneling current and a multiplexer and a shift register which are used to drive a cantilever and to select a tunneling current are mounted on the same substrate as that on which a cantilever with a tunneling current detecting tip is provided.

The present invention further provides an STM apparatus and a data processing apparatus, such as a recording apparatus, a reproducing apparatus or a recording/reproducing apparatus, which employ the above-described probe unit. Such apparatuses are reliable and capable of high-speed processing.

EXAMPLE

Examples of the present invention will be described below in detail.

Example 1

A fine probe according to the first aspect of the present invention was manufactured by the manufacturing processes shown in FIG. 1 in the manner described below.

First, a silicon wafer with a 5000Å-thick thermal oxide film formed on each of the two surfaces thereof as the protective layers 2 was prepared as a first substrate 1. Next, a desired portion of the protective film 2 was patterned by the photolithographic process and etching to partially expose the silicon in a size of 8 µm square. A recessed portion 3 was formed by crystal axis anisotropic etching which employed potassium hydroxide. Etching was conducted for 20 minutes using a 27% KOH aqueous solution having a temperature of 80° C. At that time, an inverted pyramid-shaped recessed portion 3 having a depth of 5.6 µm and surrounded by the (111) plane was formed (see FIG. 1 (a)).

Next, the entire thermal oxide films serving as the protective layers 2 were removed using a solution of HF: $NH_4F=1:5$. Thereafter, Cr was deposited on the entire first substrate 1 containing the recessed portion 3 to a thickness of 900Å as a peeling layer 4 by the vacuum deposition process (see FIG. 1 (b)).

Next, gold was deposited on the entire peeling layer 4 as the material of a fine tip 5 by the vacuum deposition process, and then the formed film was patterned by the photolithographic process and etching. The thickness of the gold film was 4.0 µm (see FIG. 1 (c)).

Subsequently, a #7059 fusion glass was prepared as a second substrate 6, and then Al was deposited on the entire surface of the second substrate 6 to a thickness of 1.0 µm as a joining layer 7 by the vacuum deposition process. The formed Al film was patterned by the photolithographic process and etching. Thereafter, the fine tip 5 on the first substrate 1 was aligned and joined to the joining layer 7 on the second substrate 6. Joining was conducted by leaving the joined substrates in an atmosphere of $N_2$ at a temperature of 300° C. for 1 hour. Consequently, an Al-Au alloy was formed, and the fine tip 5 was joined to the joining layer 7 (see FIG. 1 (d)).

Next, the first substrate 1 was peeled from the second substrate 6. At that time, peeling was conducted on an interface between the peeling layer 4 and the fine tip 5, whereby a fine tip was manufactured (see FIG. 1 (e)).

The thus-manufactured fine tip was observed by SEM (scanning type electronic microscope). It was found that the distal end of the fine tip was sharp. The radius of curvature of the distal end of the tip was 0.03 µm, and the height thereof was 10 µm.

Example 2

The fine tip according to the first aspect of the present invention was manufactured by the manufacturing processes shown in FIG. 2 in the manner described below.

First, a silicon wafer with a 5000Å-thick thermal oxide film formed on each of the two surfaces thereof as the protective layers 2 was prepared as a first substrate 1. Next, a desired portion of the protective film 2 was patterned by the photolithographic process and etching to partially expose the silicon in a size of 10 µm square. Subsequently, a recessed portion 3 was formed by crystal axis anisotropic etching which employed potassium hydroxide. Etching was conducted for 25 minutes using a 27% KOH aqueous solution having a temperature of 80° C. At that time, an inverted pyramid-shaped recessed portion 3 having a depth of 7.1 µm and surrounded by the (111) plane was formed (see FIG. 2(a)).

Next, the entire thermal oxide films serving as the protective layers 2 were removed using a solution of HF: $NH_4F=1:5$. Thereafter, Ag was deposited on the entire first substrate 1 containing the recessed portion 3 to a thickness of 700Å as a peeling layer 4 by the vacuum deposition process (see FIG. 2(b)).

Figure 2A:
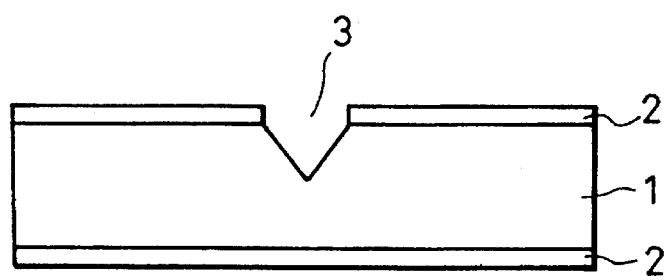
FIG. 2, comprising FIGS. 2(*a*), 2(*b*), 2(*c*), 2(*d*) and 2(*e*), illustrates another examples of the major processes of the fine tip manufacturing method provided in the first aspect of the present invention.
Figure 2B:
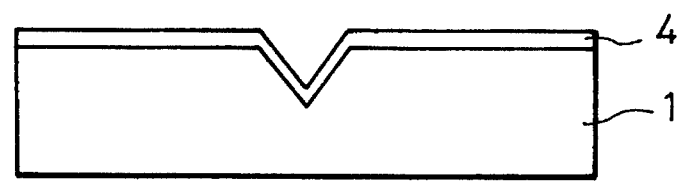
Figure 2C:
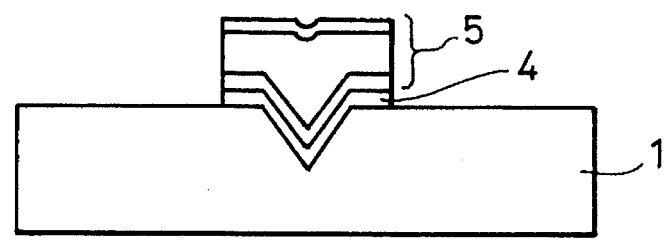
Figure 2D:
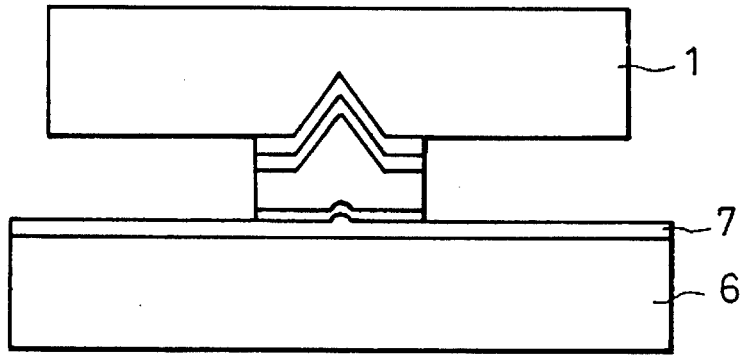
Figure 2E:
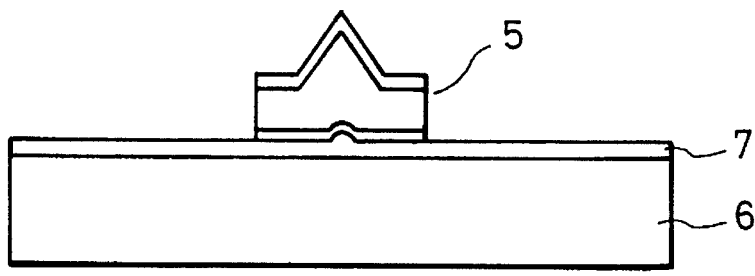
Figure 3A:
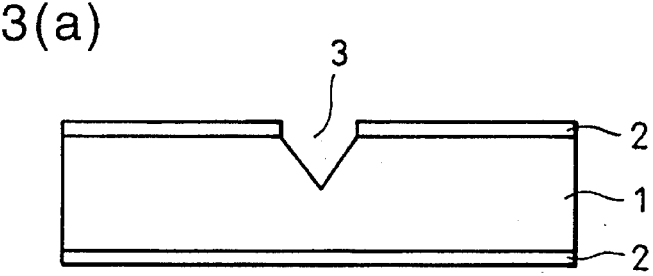
FIG. 3, comprising FIGS. 3(*a*), 3(*b*), 3(*c*), 3(*d*) and 3(*e*), illustrates examples of the major processes for forming the fine tip provided in the first aspect of the present invention on a cantilever.
Figure 3B:
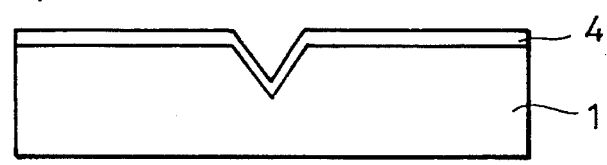
Figure 3C:
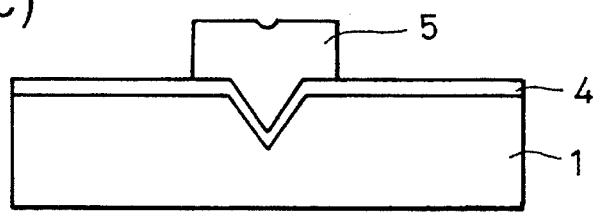
Figure 3D:
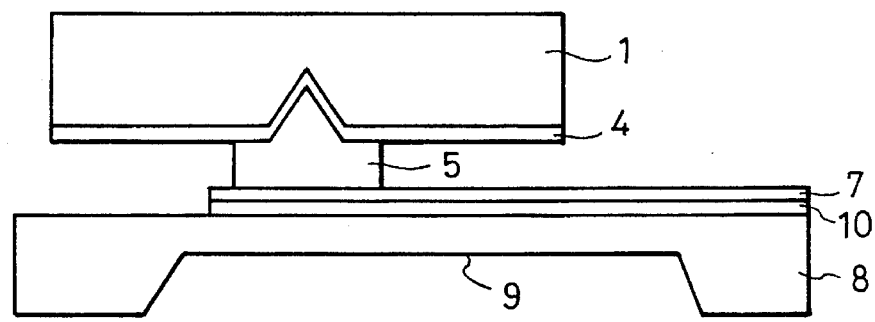
Figure 3E:
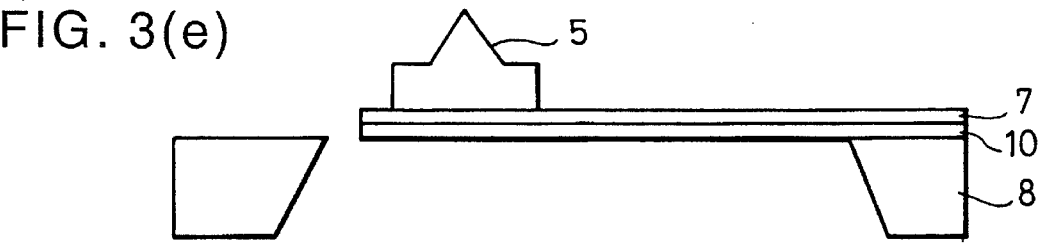

Next, Pt, Ni and Au were continuously deposited on the entire peeling layer 4 to thicknesses of 0.3 µm, 5 µm and 1 µm, respectively, as the materials of a fine tip 5 by the electron beam deposition process, and then the formed films were patterned by the photolithographic process and etching (see FIG. 2(c)).

Subsequently, a silicon wafer was prepared as the second substrate 6, and then Al was deposited on the entire surface of the second substrate 6 to a thickness of 1.0 μm as a joining layer 7 by the vacuum deposition process. The formed Al film was patterned by the photolithographic process and etching. Thereafter, the fine tip 5 on the first substrate 1 was aligned and joined to the joining layer 7 on the second substrate 6. Joining was conducted by leaving the joined substrates in an atmosphere of $N_2$ at a temperature of 300° C. for 1 hour. Consequently, an Al-Au alloy was formed, and the fine tip 5 was joined to the joining layer 7 (see FIG. 2(d)).

Next, the first substrate 1 was peeled from the second substrate 6. At that time, peeling was conducted on an interface between the peeling layer 4 and the first substrate 1. Subsequently, Ag which formed the peeling layer 4 on the fine tip was removed using a nitric acid aqueous solution, whereby a fine tip was manufactured (see FIG. 2(e)).

The thus-manufactured fine tip was observed by SEM. It was found that the distal end of the fine tip was sharp. The radius of curvature of the distal end of the tip was 0.04 μm, and the height thereof was 13.5 μm.

Example 3

The tips were manufactured in the same manner as that of Example 2 with the exception that a multiprobe was prepared and that palladium was used as the tip material. 100 probes were arranged in a matrix. The pitch of the probes was 200 μm. The plurality of tips manufactured by the above-described manner were observed by SEM. The height of each of the tips was 13.5 μm±0.1 μm, and the radius of curvature of the distal end of the tip was 0.03 μm±0.01 μm. It was found that the tips in the multiprobe had the uniform shape.

Example 4

In this example, the fine tip provided in the first aspect of the present invention was formed on a cantilever. The manufacturing method thereof will be described with reference to FIG. 3.

First, a silicon wafer with a 5000Å-thick thermal oxide film formed on each of the two surfaces thereof as the protective layers 2 was prepared as a first substrate 1. Next, a desired portion of the protective film 2 was patterned by the photolithographic process and etching to partially expose the silicon in a size of 8 μm square. Thereafter, a recessed portion 3 was formed by crystal axis anisotropic etching which employed potassium hydroxide. Etching was conducted for 20 minutes using a 27% KOH aqueous solution having a temperature of 80° C. At that time, an inverted pyramid-shaped recessed portion 3 having a depth of 5.6 μm and surrounded by the (111) plane was formed (see FIG. 3(a)).

Next, the entire thermal oxide films serving as the protective layers 2 were removed using a solution of HF:$NH_4F$=1:5. Thereafter, Cr was deposited on the entire first substrate 1 containing the recessed portion 3 to a thickness of 900Å as a peeling layer 4 by the vacuum deposition process (see FIG. 3(b)).

Next, gold was deposited on the entire peeling layer 4 as the material of a fine tip 5 by the vacuum deposition process, and then the formed film was patterned by the photolithographic process and etching. The thickness of the gold film was 4.0 μm (see FIG. 3(c)).

Subsequently, a second substrate was prepared. The second substrate was a single crystal silicon substrate 8 with a 1.5 μm-thick thermal oxide film and a 0.5 μm-thick Al film formed thereon as a cantilever layer 10 and a joining layer 7 in that order, respectively. Thereafter, the cantilever layer 10 and the joining layer 7 were patterned by the photolithographic process and etching in the form of a cantilever. At that time, the width of the cantilever was 50 μm, and the length thereof was 500 μm. After the cantilever layer 10 was formed, the portion of the rear surface of the silicon wafer corresponding to the cantilever was partially etched beforehand to form a silicon membrane 9. Thereafter, the fine tip 5 on the first substrate 1 was aligned and joined to the joining layer 7 on the single crystal silicon substrate 8 which served as the second substrate. Joining was conducted by leaving the joined substrates in an atmosphere of $N_2$ at a temperature of 300° C. for 1 hour. Consequently, an Al-Au alloy was formed, and the fine tip 5 was joined to the joining layer 7 (see FIG. 3(d)).

Next, the first substrate 1 was peeled from the second substrate 6. At that time, peeling was conducted on an interface between the peeling layer 4 and the fine tip 5. Subsequently, the silicon membrane 9 of the second substrate located below the cantilever was removed by etching, whereby a cantilever type probe was manufactured (see FIG. 3(e)).

The thus-manufactured fine tip was observed by SEM (scanning type electronic microscope). It was found that the distal end of the fine tip was sharp. The radius of curvature of the distal end of the tip was 0.03 μm, and the height thereof was 10 μm.

Example 5

In this example, a piezoelectric bimorph assuring a three-dimensional displacement was provided as the cantilever of Example 4. A signal processing circuit element for amplifying a tunneling current and a signal processing circuit element for selectively driving a cantilever were formed on the same substrate as that on which the cantilever was formed, and the fine tip provided in the first aspect of the present invention was formed on the cantilever. The manufacturing method of this example will be described below with reference to FIGS. 4 through 7.

The manufacturing process includes the circuit portion process, the cantilever process and the fine tip process which are conducted at the same time, the fine tip joining process and the substrate removing process.

Figure 4A:
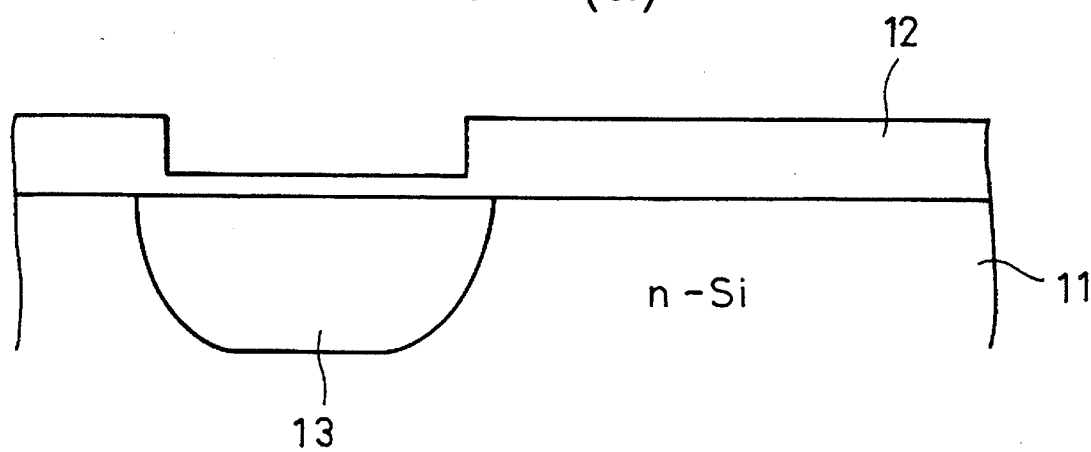
FIG. 4, comprising FIGS. 4(*a*), 4(*b*) and 4(*c*), illustrates examples of the major processes for forming the fine tip provided in the first aspect of the present invention on a second substrate on which a signal processing circuit element and a cantilever are formed.
Figure 4B:
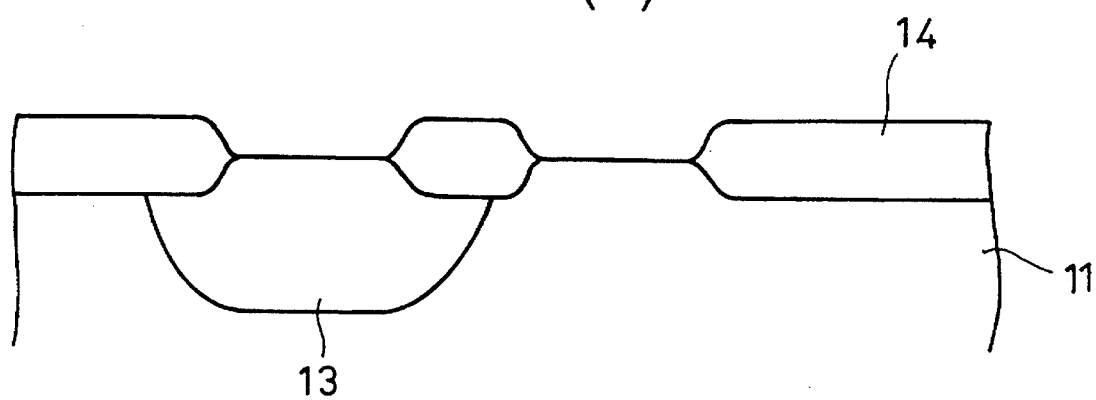
Figure 4C:
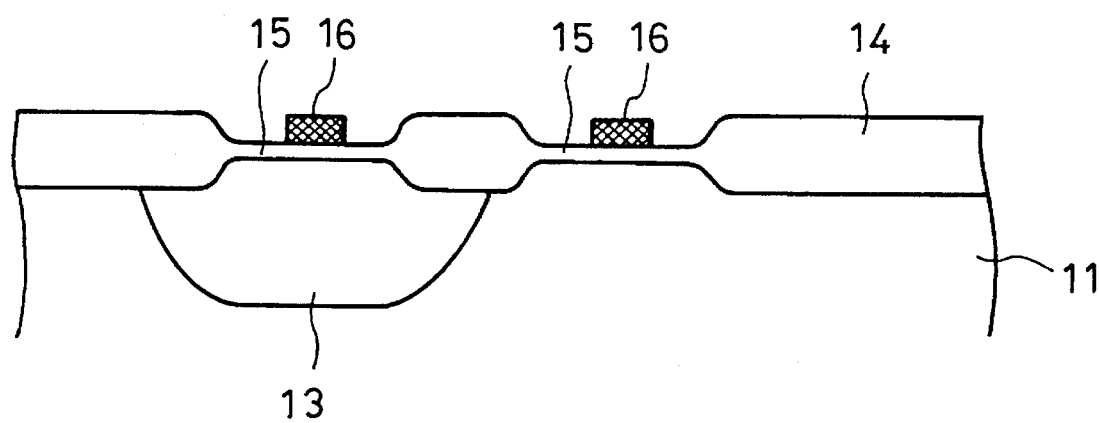

First, the circuit portion process in which a second substrate is manufactured and the cantilever process will be described. The second substrate is a substrate on which the signal processing circuit element and a cantilever are formed. A CMOS transistor was used as the device of the signal circuit portion. An N type silicon wafer having a plane orientation (100) and a specific gravity of 1 to 2Ω·cm was used as a substrate 11. An oxide layer 12 was formed to a thickness of 7000Å using an oxidation furnace as an implantation masking layer. A p well area 13 was removed, and a thermal oxide film was formed to a thickness of 1000Å as a buffer layer by the oxidation furnace. The P well area 13 was formed by implanting B ions by an ion implantation device and by conducting heat treatment for 85 minutes at a temperature of 1150° C. using a diffusion furnace (see FIG. 4(a)). After the oxide film was entirely removed and the thermal oxide film was formed to a thickness of 500Å, a silicon nitride film was formed to a thickness of 2000Å by an LPCVD device. After the portion of the silicon nitride film which was located on an area other than the areas on which NMOS and PMOS were formed was removed and the resist process was completed, P (phosphorus) ions for stopping a P channel were implanted. Similarly, after the resist process was completed, B (boron) ions for stopping an N channel were implanted. A thermal oxide film was formed to a thickness of 8000Å using the oxidation furnace to form a LOCOS (local oxidation silicon) layer 14. The structure shown in FIG. 4(b) was obtained by removing the portion of the silicon nitride film located on an area other than the LOCOS layer 14. Next, a thermal oxide film was formed to a thickness of 350Å using the oxidation furnace to form a gate film layer 15, and $BF_2$ ions were implanted over the entire surface of the gate film layer 15 in order to control a threshold voltage ($V_{th}$) of MOS. A polysilicon was formed to a thickness of 4500Å by the LPCVD device, and P (phosphorus) ions were implanted over the entire surface thereof by an implanting device. Next, gate electrodes 16 were formed by removing the portion of polysilicon formed on the rear surface, by conducting annealing for 30 minutes at 950 20 C. using the diffusion furnace, and then by patterning and oxidizing polysilicon, as shown in FIG. 4(c). Although the cantilever area was not shown, it has the same structure as that of the PMOS area. Next, a source and a drain 17 of a NMOS transistor were formed by patterning the resist and then by implanting As ions. Similarly, a source and a drain 18 were formed by patterning the resist and then by implanting $BF_2$ ions. Thereafter, the structure shown in FIG. 5(a) was obtained by conducting annealing for 5 minutes at 1000° C. using the diffusion furnace, by forming BPSG (a boron, phosphorous-doped silicon oxide film) to a thickness of 7000Å as an interlayer insulator 19 by an atmospheric CVD device, and then by conducting annealing for 20 minutes at 950° C.

Figure 5A:
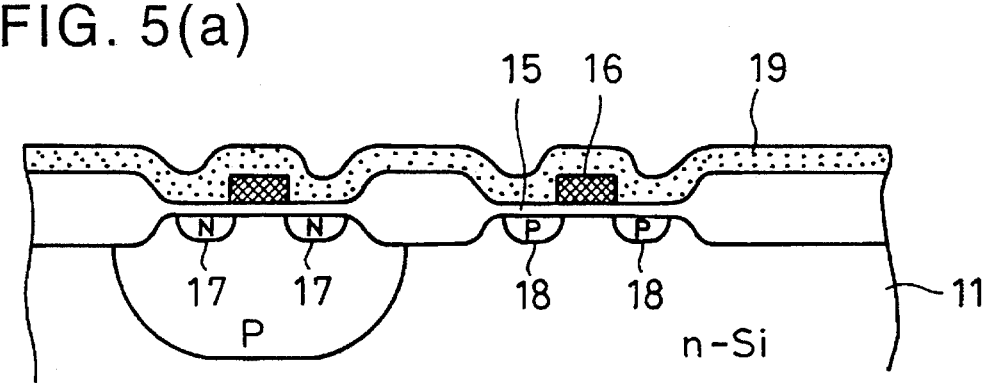
FIG. 5, comprising FIGS. 5(*a*), 5(*b*), 5(*c*) and 5(*d*), illustrates examples of the major processes for forming the fine tip provided in the first aspect of the present invention on the second substrate on which the signal processing circuit element and the cantilever are formed.
Figure 5B:
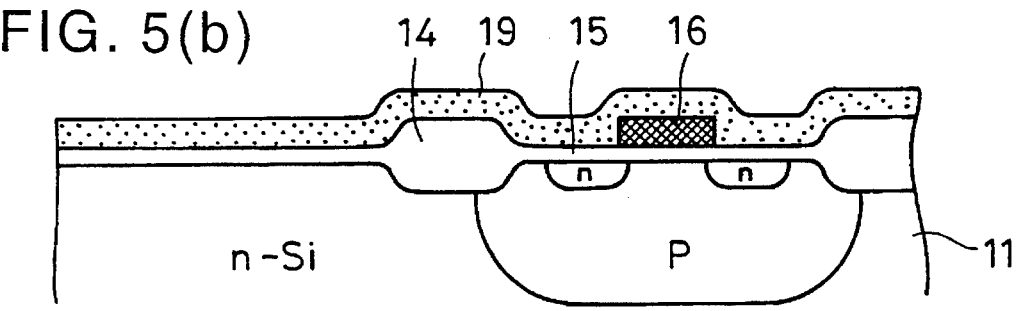
Figure 5C:
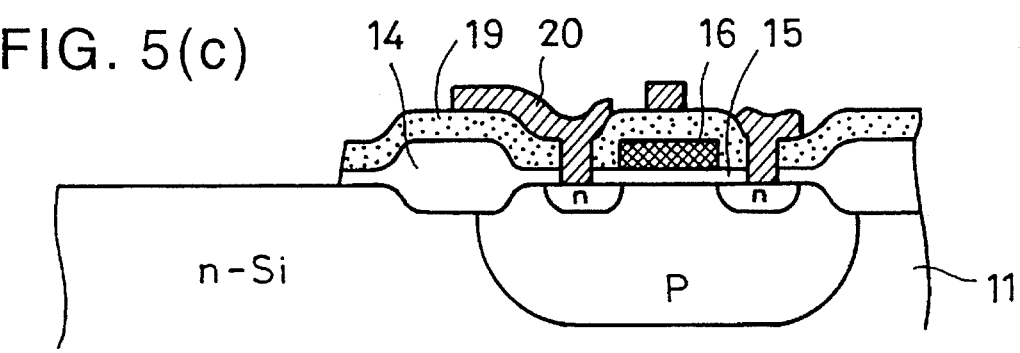
Figure 5D:
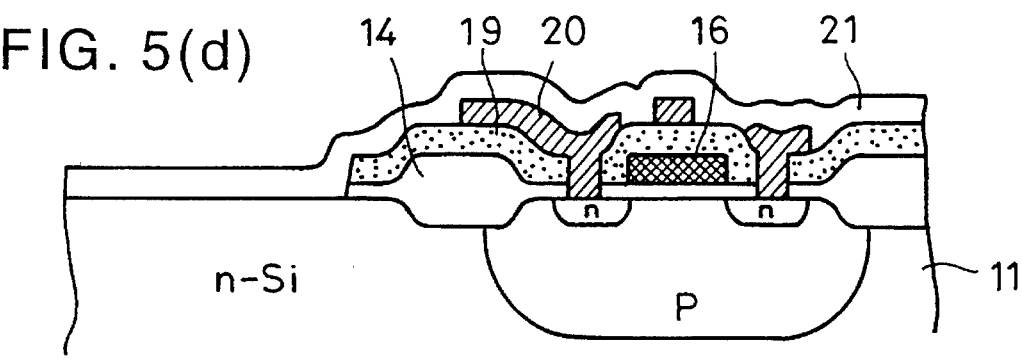

FIG. 5(b) shows the NMOS and the cantilever areas in the structure shown in FIG. 5(a). Thereafter, the cantilever area and NMOS will be described in detail with reference to FIG. 5.

Next, in order to obtain contact between the transistor or the like in the signal circuit portion with an interconnection, the portion of the PBSG layer 19 and the portion of the gate film layer 15 were removed by patterning to form a contact hole. An interconnection layer 20 was formed by forming an Al-Si film by a sputtering device and then by conducting etching for patterning. Next, the portion of the BPSG layer 19 and the portion of the gate film layer 15 which were located in the cantilever area were removed to obtain the structure shown in FIG. 5(c). Thereafter, a SiON film was formed to a thickness of 8000Å by a plasma CVD device to form a protective film 21 (see FIG. 5(d)).

Figure 6A:
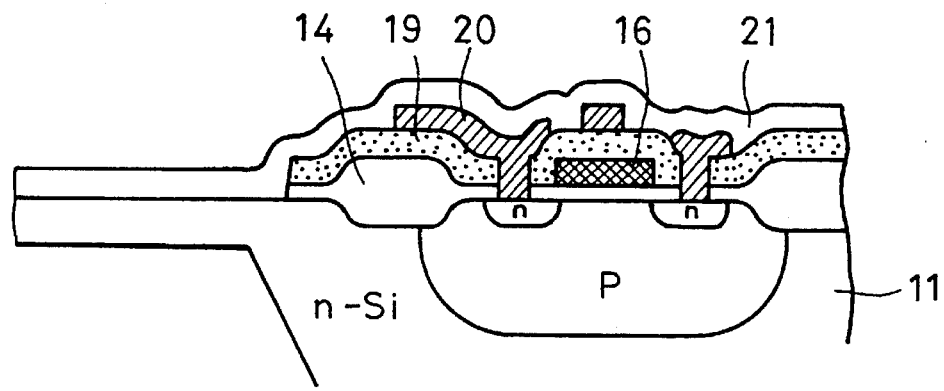
FIG. 6, comprising FIGS. 6(*a*), 6(*b*) and 6(*c*), illustrates examples of the major processes for forming the fine tip provided in the first aspect of the present invention on the second substrate on which the signal processing circuit element and the cantilever are formed.
Figure 6B:
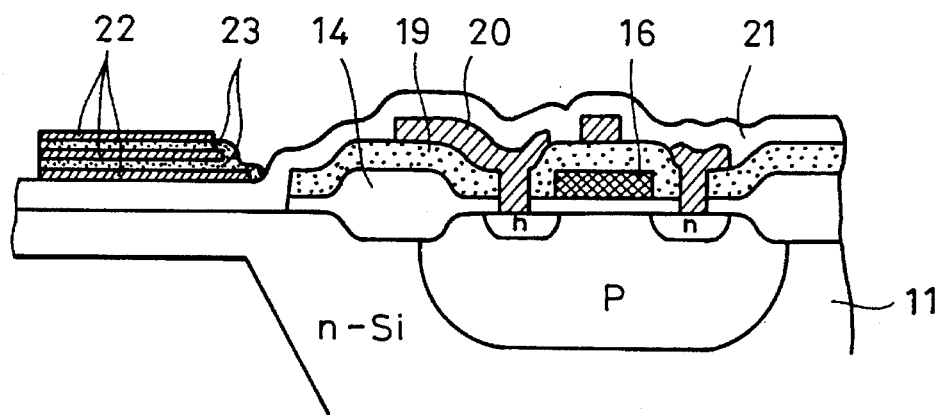
Figure 6C:
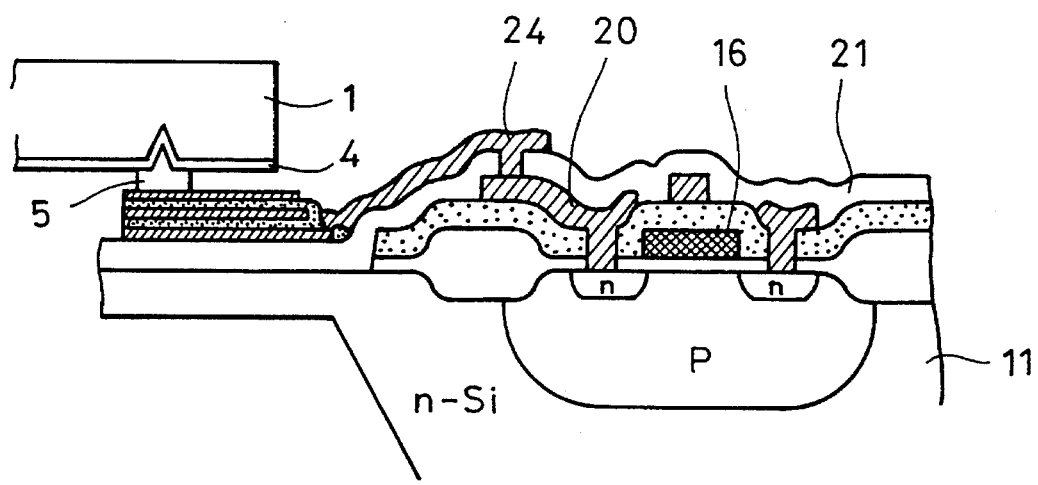
Figure 7:
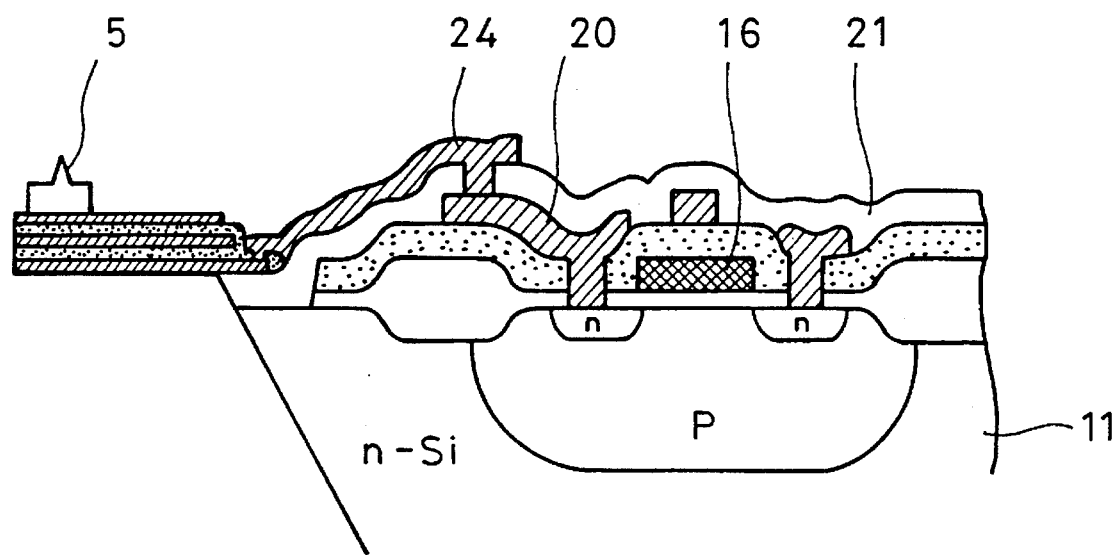
FIG. 7 illustrates an example of the major process for forming the fine tip provided in the first aspect of the present invention on the second substrate on which the signal processing circuit element and the cantilever are formed.

Before the cantilever area was formed, the Si substrate 11 was anisotropically etched from the rear surface thereof to make the cantilever area shape like a membrane (see FIG. 6(a)).

Next, films constituting the cantilever were laminated in the manner described below: first, Cr was formed to a thickness of 20Å by a deposition device and then Au was formed to a thickness of 1000Å by the lift-off method as lower electrode layers 22. After ZnO was formed to a thickness of 5000Å as a piezoelectric layer 23 by the sputtering device, Au was formed again to a thickness of 2000Å by the lift-off method. After ZnO was formed to a thickness of 5000Å by the sputtering device, Au was formed to a thickness of 1000Å by the lift-off method, whereby the bimorph structured cantilever portion consisting of three electrode layers 22 and two piezoelectric layers 23 was formed (see FIG. 6(b)).

Next, in order to connect the electrode of the cantilever portion with the electrode of the signal circuit portion, part of the piezoelectric layer 23 was removed by etching to form a contact hole. Similarly, part of the protective layer 21 was removed by etching in the signal circuit portion to form a contact hole, and then Al was formed by the lift-off method to form a connection electrode layer 24. Subsequently, the fine tip process was conducted. In this process, the fine tip material 5, which was gold formed on the first substrate 1 by the vacuum deposition method, was aligned with and joined to the cantilever electrode layer 22 on the second substrate 11 in the same manner as that of Example 4 (see FIG. 6(c)). Joining was achieved by conducting pressurization in an atmosphere of $N_2$ at a temperature of 100° C.

Next, peeling between the first and second substrates 1 and 11 was conducted on an interface between the peeling layer 4 and the fine top 5. Thereafter, a cantilever type fine tip was manufactured by removing the portion of the silicon membrane and the portion of SiOn which were located below the cantilever on the second substrate (FIG. 7)).

The fine tip manufactured in the manner described above was observed with SEM. It was observed that the distal end was sharp. The radius of curvature of the distal end of the tip was 0.03 μm, and the height thereof was 10 μm. The width of the cantilever was 100 μm, and the length thereof was 350 μm. The shape of the cantilever is not limited to that shown in this invention.

Example 6

Figure 8:
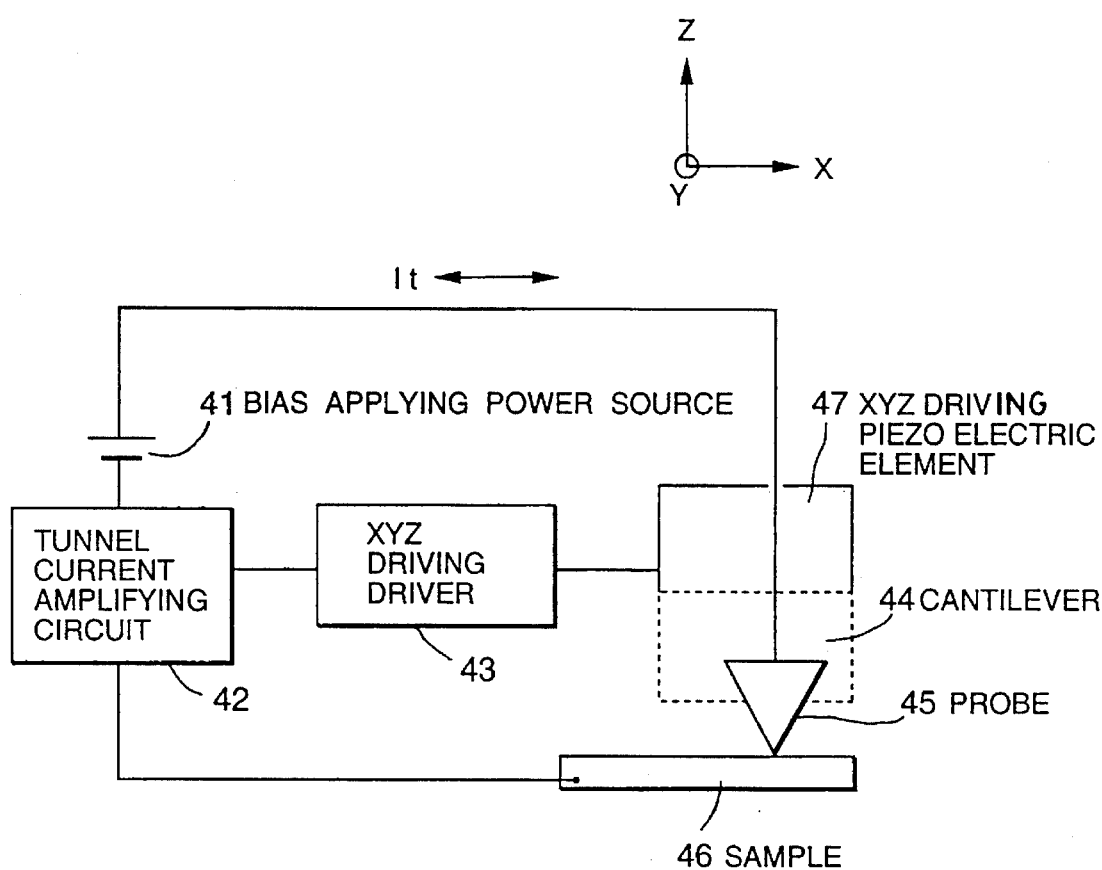
FIG. 8 is a block diagram of an example of an STM apparatus which employs the fine tip provided in the first aspect of the present invention.

A STM apparatus which employed the fine tip obtained in Example 4 was manufactured. FIG. 8 is a block diagram of the STM apparatus of this example. In FIG. 8, reference numeral 41 denotes a bias applying power source; 42, a tunneling current amplifying circuit; 43, a XYZ driving driver; 44, a cantilever; 45, a probe; 46, a sample; and 47, a XYZ driving piezoelectric element. In this apparatus, a tunneling current It which flows between the probe 45 and the sample 46 is detected, and the feedback operation is conducted so that It can be maintained fixed so as to drive the XYZ driving piezoelectric element 47 in the Z direction and thereby maintain the distance between the probe 45 and the sample 46 fixed. An STM image, which is the two-dimensional image of the sample 46, can be obtained by driving the XYZ driving piezoelectric element 47 in the X and Y directions. When a cut open surface of a HOPG (a highly-oriented pyrolyric graphite) was observed as the sample 46 at a bias current of 4 nA and in a scanning area of 100Å×100Å, an excellent atomic image could be obtained at an excellent reproducibility.

Example 7

In this example, the probe unit provided in the second aspect of the present invention, shown in FIG. 9, was manufactured.

The manufacturing method of this example will be described below with reference to FIG. 10.

First, silicon nitride was formed on an n-type silicon (100) substrate 51 whose two surfaces had been polished to a thickness of 500Å as masking layers 55 and 56 by CVD, and then a 5.6 μm-deep inverted pyramid-shaped recessed portion 58 was formed at a portion of the n-type silicon substrate 51 corresponding to the distal end of a cantilever by patterning a circular open portion 57 having a diameter of 8 μm, by removing the silicon nitride film 55 on the front surface of the substrate by dry etching which employed $CF_4$ gas and then by removing the silicon substrate 51 by etching which employed a potassium hydroxide aqueous solution heated to 80° C. (see FIG. 10(a)).

Next, the silicon nitride film 55 on the surface of the substrate was removed by dry etching which employed $CF_4$ gas, and then silicon nitride was formed again by CVD. Thereafter, the portion of the substrate, on which the lower electrode 54a, the tunneling current tip 50 and the tunneling current interconnection 59 were to be formed, was patterned and then platinum was formed to a thickness of 1000Å by sputtering and then lifted off (see FIG. 10(b)).

Next, the piezoelectric (ZnO) bimorph serving as the driving portion was formed in the manner described below. First, the first piezoelectric layer 53a was formed, and then the intermediate electrode layer 54b was formed. Thirdly, the second piezoelectric layer 53b was formed, and then fourthly, the upper electrode layer 54c was formed. Both the intermediate electrode 54b and the upper electrode 54c were manufactured in the same manner as that of the lower electrode 54a. Formation of the ZnO film was conducted using a RF sputtering device. At that time, the target was ZnO, and the atmosphere was a mixture gas of $O_2$ and Ar in which the gas pressure ratio of $O_2$ and Ar was 1:1 and the gas total pressure of $O_2+Ar$ was 12 mtorr. After ZnO was formed to a thickness of 10000Å in the manner described above, the formed film was patterned using the normal photolithographic process which employed a resist and then etched using an aqueous solution of ammonium hydroxide and hydrogen peroxide (see FIG. 10(c)).

Subsequently, the silicon nitride film 56 on the rear surface of the substrate was removed by dry etching which employed $CF_4$ gas to form a back etched open portion 60. After the front surface of the substrate was sealed, the silicon substrate 51 was etched using the potassium hydroxide aqueous solution heated to 80° C.

Figure 10A:
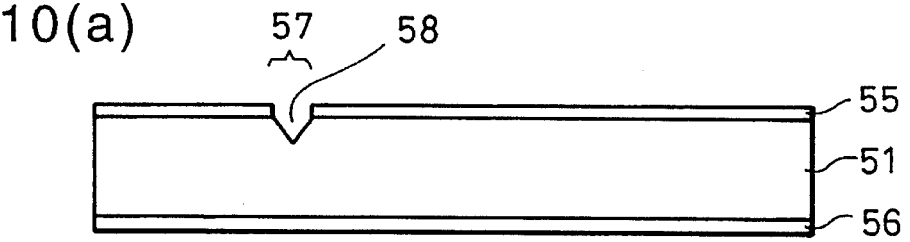
FIGS. 10(a), 10(b), 10(c) and 10(d), illustrates examples of the major processes of the probe unit manufacturing method provided in the second aspect of the present invention.
Figure 10B:
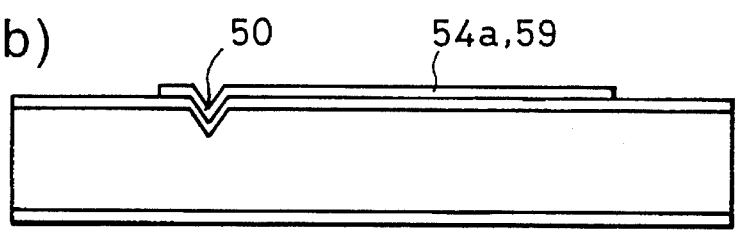
Figure 10C:
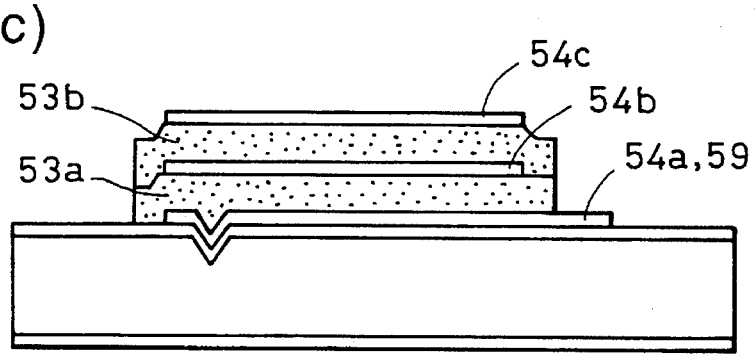
Figure 10D:
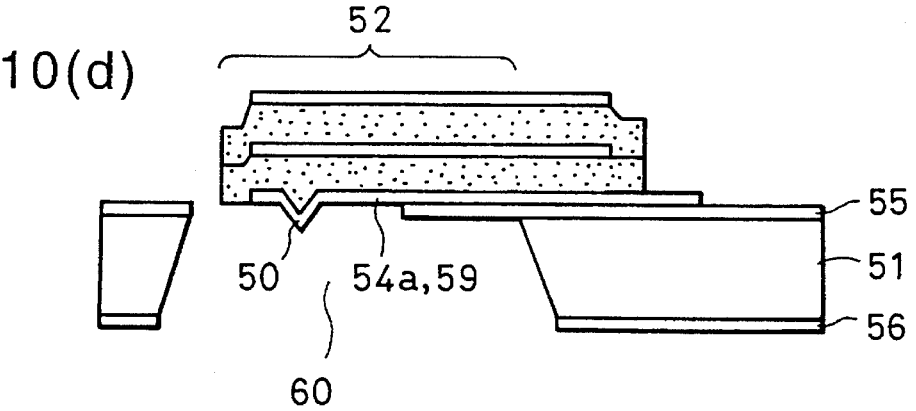

Finally, the silicon nitride film 55 on the front surface of the substrate was removed from the rear surface thereof by dry etching which employed $CF_4$ gas, whereby the cantilever 52 was formed (see FIG. 10(d)).

The bimorph piezoelectric member may also be of the type which can be driven in both the horizontal and vertical directions. This type of bimorph piezoelectric member can be provided by dividing the upper and lower driving electrodes in the direction of the length of the cantilever and then by applying different voltages to right and left electrodes.

In the probe unit manufactured in the manner described above, the distal end of the tip thereof was sharp. When the plurality of probe units were manufactured, the shape and characteristics thereof were substantially uniform.

Example 8

In this example, a data processing apparatus which employed a plurality of cantilever type probe units provided in the second aspect of the present invention was manufactured.

Figure 11:
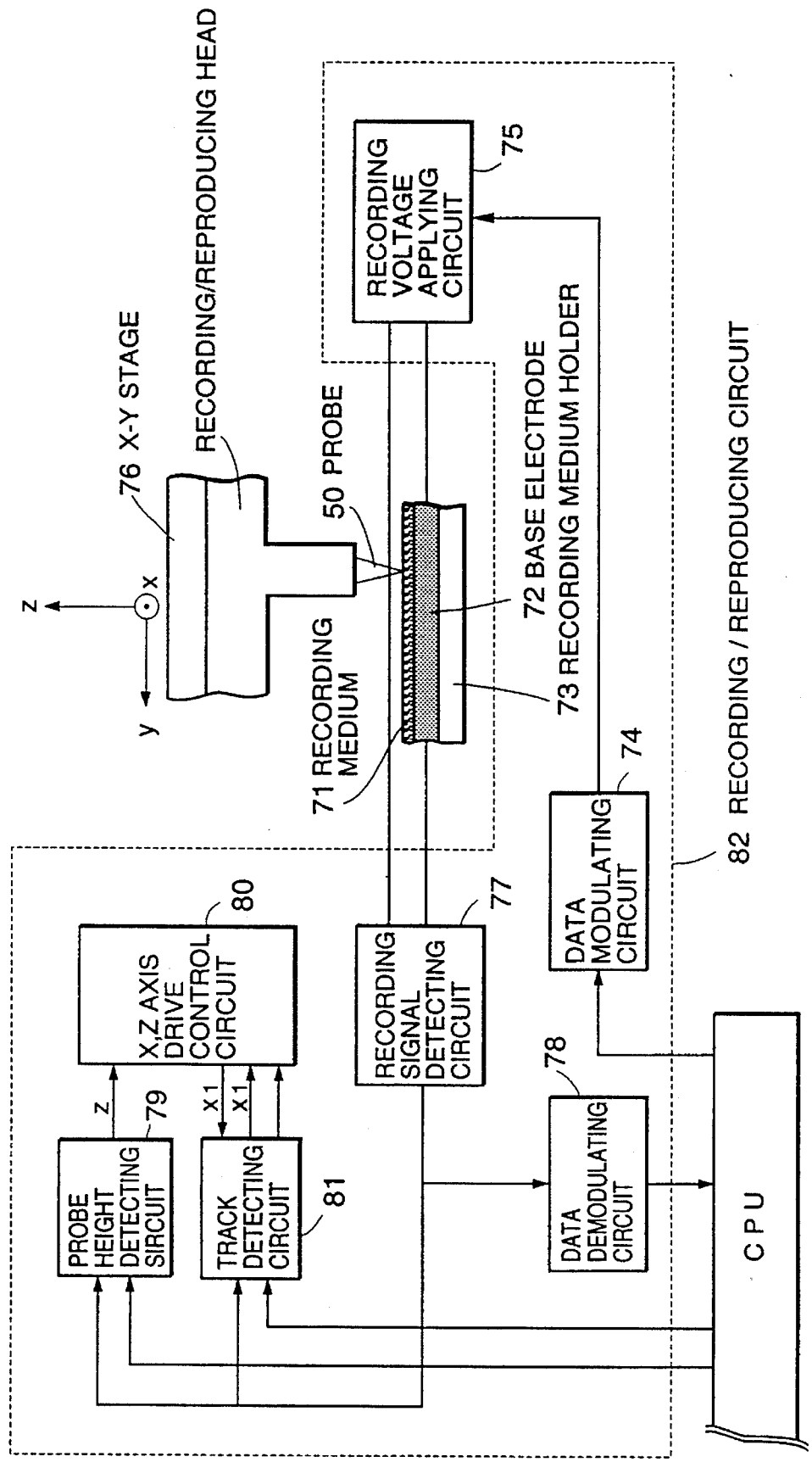
FIG. 11 illustrates the major structure of an example of a data processing apparatus which employs the probe unit provided in the second aspect of the present invention.
Figure 12:
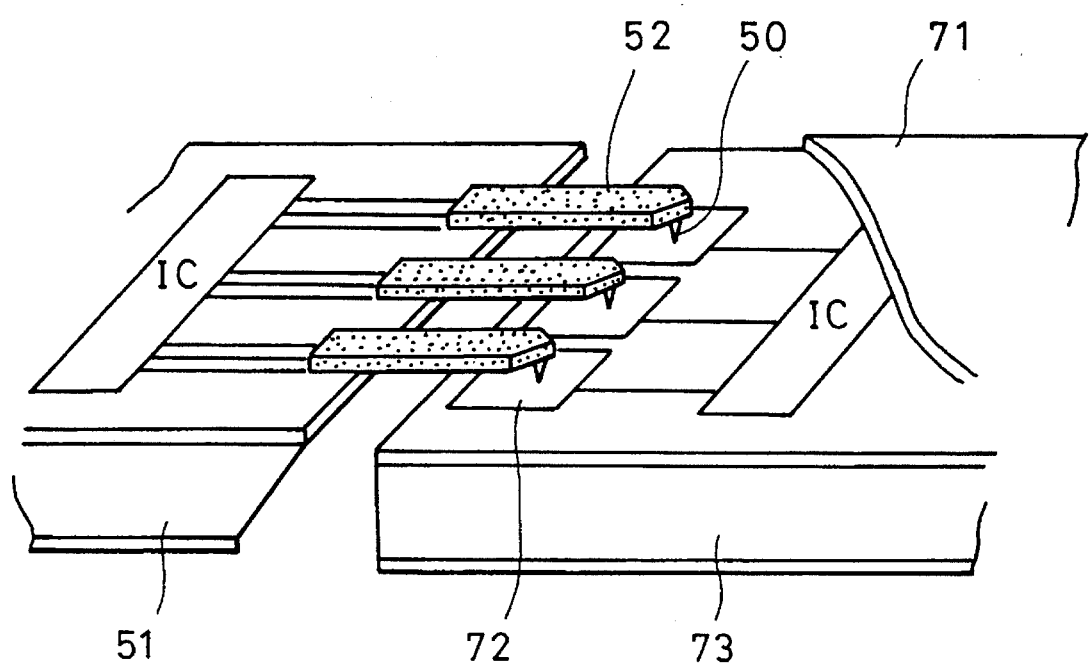
FIG. 12 schematically shows an example of the layout of a cantilever type probe unit and a recording medium substrate in the data processing apparatus according to the present invention.

FIG. 11 illustrates the structure of the major portion of the data processing apparatus according to the present example. FIG. 12 shows the layout of the cantilever type probe units and a recording medium substrate. In this data processing apparatus, a plurality of cantilever type probe units obtained in Example 7 are disposed on a recording/reproducing head. These plurality of probes 50 are disposed such that they face a medium uniformly. Reference numeral 71 denotes a recording medium on which data is recorded; 72 denotes a lower electrode for applying a voltage between the medium and the probe; and 73 a recording medium holder. The layer of recording medium 71 is made of a metal, semiconductor, oxide or organic thin film whose surface can be deformed in a convex form by the tunneling current generated by the tunneling current tip 50 (see p 244 of Staufer, Appl. Phys. Letters, 51(4), 27 Jul., 1987) or in a concave form (see p 2447, Heinzelmann, Appl. Phys. Letters, Vol. 53, No. 24 Dec., 1988) or of an organic thin film whose electric property changes (which may generate the electric memory effect) by the presence of the above-described tunneling current. Suitable examples of the organic thin films whose electric property changes include those described in Japanese Patent Laid-Open No. sho 63-161552. A more preferable example of such an organic thin film is a Langmuir-Blodgett's film.

The recording medium is manufactured in the manner described below: first, a silicon nitride film is formed on the surface of a silicon substrate to a thickness of 1500Å by the CVD process. Next, Cr is formed to a thickness of 50Å by the vacuum deposition method, and then Au is formed to a thickness of 300Å. After patterning of the base electrodes 72 and base electrode interconnections is performed using a resist AZ1370 (manufactured by Hoechst), etching is conducted using an aqueous solution of iodine and potassium iodide. Thereafter, four layers of SOAZ (squarylium-bis-6-octylazlene) are laminated by the LB method.

Reference numeral 74 denotes a data modulating circuit for modulating the data to be recorded into a signal suited for recording; and 75 denotes a recording voltage applying circuit for applying a voltage between the recording medium 71 and the tip 50 to record the signal modulated by the data modulating circuit on the recording medium 71. When the tip is moved to a predetermined distance from the recording medium 71 and a rectangular pulse voltage having, for example, 3 volts and a width of 50 ns is applied by the recording voltage applying device 75, the property of the recording medium 71 changes and a portion thereof whose electric resistance is low is generated. Data is recorded by performing this operation while scanning the surface of the recording medium 71 by the tips 50 using an X-y stage 76. Although not shown, the scanning mechanism by the X-Y stage 76 may employ a cylindrical piezo actuator, a parallel spring, a differential micrometer, a voice coil or an inchworm.

Reference numeral 77 denotes a recording signal detecting circuit for applying a voltage between the dip 50 and the recording medium 71 to detect a tunneling current which flows therebetween; and 78 denotes a data demodulating circuit for demodulating the tunneling current signal detected by the recording signal detecting circuit 77. For reproduction, the tip 50 is separated from the recording medium by a predetermined distance, and a bias voltage of, for example, 200 mV, which is lower than the recording voltage, is applied between the tip 50 and the recording medium 71. A tunneling current signal, which is detected by the recording signal detecting circuit 77 while the recording medium 71 is scanned by the tip 50 along the recording data row in the above-described state, corresponds to a recording data signal. Thus, the detected tunneling current signal is converted into a voltage, and the converted voltage signal is demodulated by the data demodulating circuit 78 to obtain a reproduced data signal.

A probe height detecting circuit 79 receives the detection signal of the recording signal detecting circuit 77, processes the signal component which has been left by cutting the high-frequency vibration component according to the presence or absence of a data bit, and transmits a command signal to a x, z axis drive control circuit 80 in order to control the tip 50 in the Z direction in such a manner that the remaining signal value remains fixed. Consequently, the distance between the tip 50 and the recording medium 71 is maintained substantially fixed.

A track detecting circuit 81 detects a shift of the tip 50 from the path along which data is to be recorded or the recorded data row (hereinafter the path and the data row being referred to as tracks) when the tip is scanned on the recording medium 71.

The above-described data modulating circuit 74, the recording voltage applying circuit 75, the recording signal detecting circuit 77, the data demodulating circuit 78, the probe height detecting circuit 79, the x, z axis drive control circuit 80 and the track detecting circuit 81 form a recording/reproducing circuit 82.

In the recording/reproducing head, the recording/reproducing circuit 82 is provided for each of the plurality of probes which oppose the recording medium and the driving mechanism thereof. Therefore, recording, reproduction and the displacement control can be performed separately on each of the probes.

The recording/reproducing apparatus has been described as the data processing apparatus of this example. However, the present invention can also be applied to a recording apparatus, a reproducing apparatus or a scanning tunneling microscope.

Example 9

Figure 13:
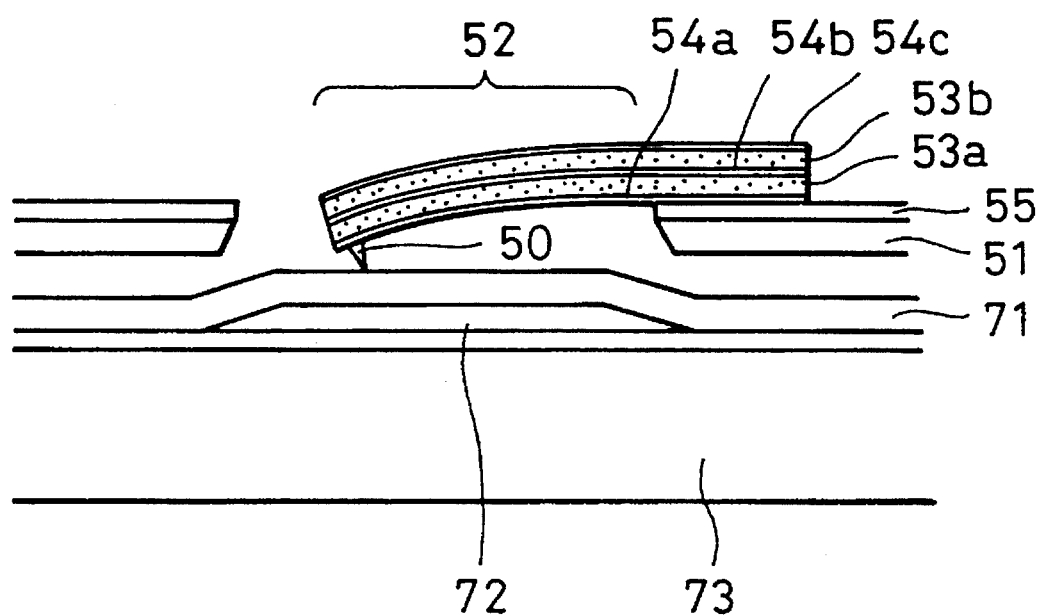
FIG. 13 schematically shows another example of the layout of the cantilever type probe unit and the recording medium substrate in the data processing apparatus according to the present invention.
Figure 14:
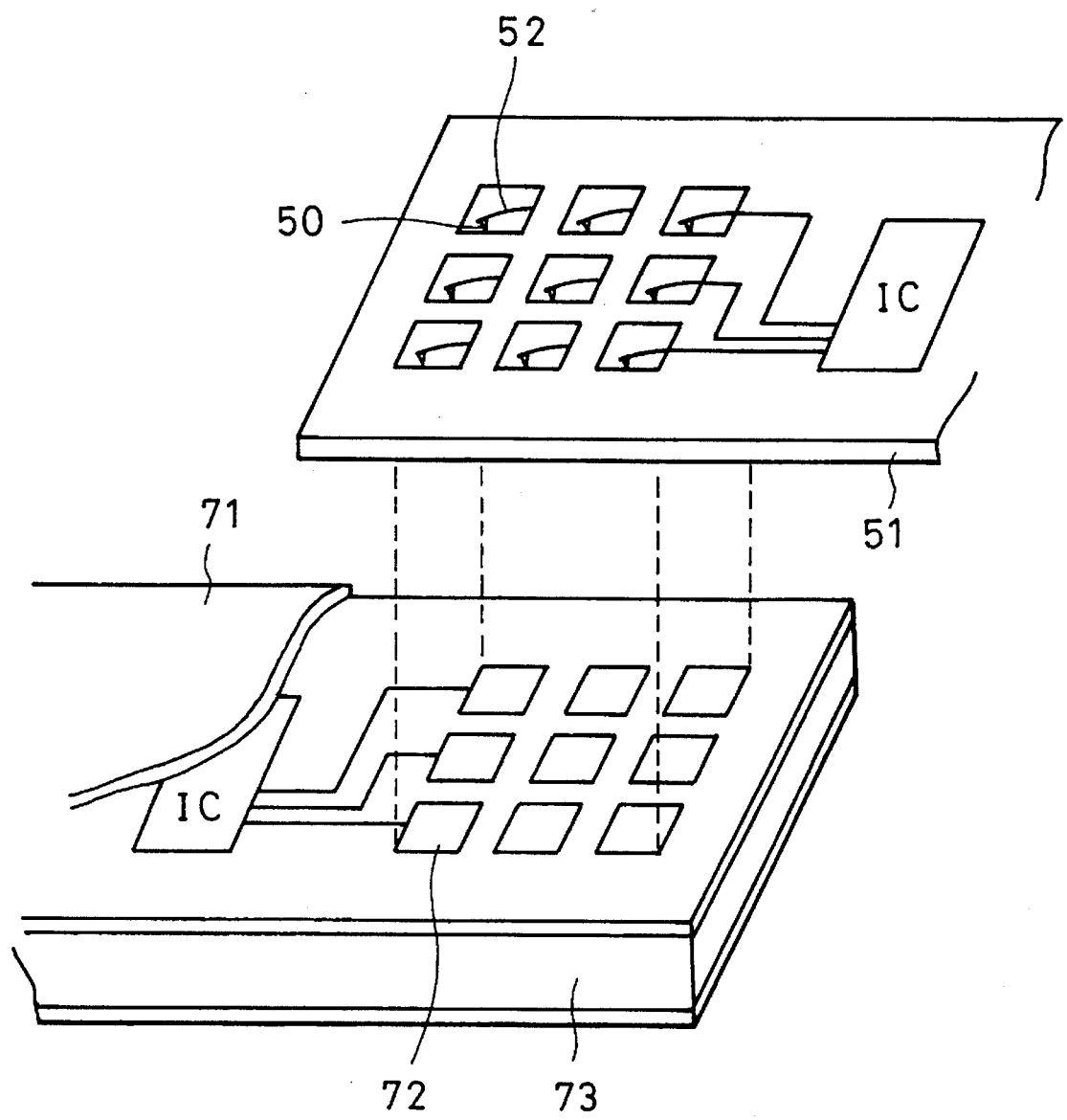
FIG. 14 schematically shows still another example of the layout of the cantilever type probe unit and the recording medium substrate in the data processing apparatus according to the present invention.
Figure 15:
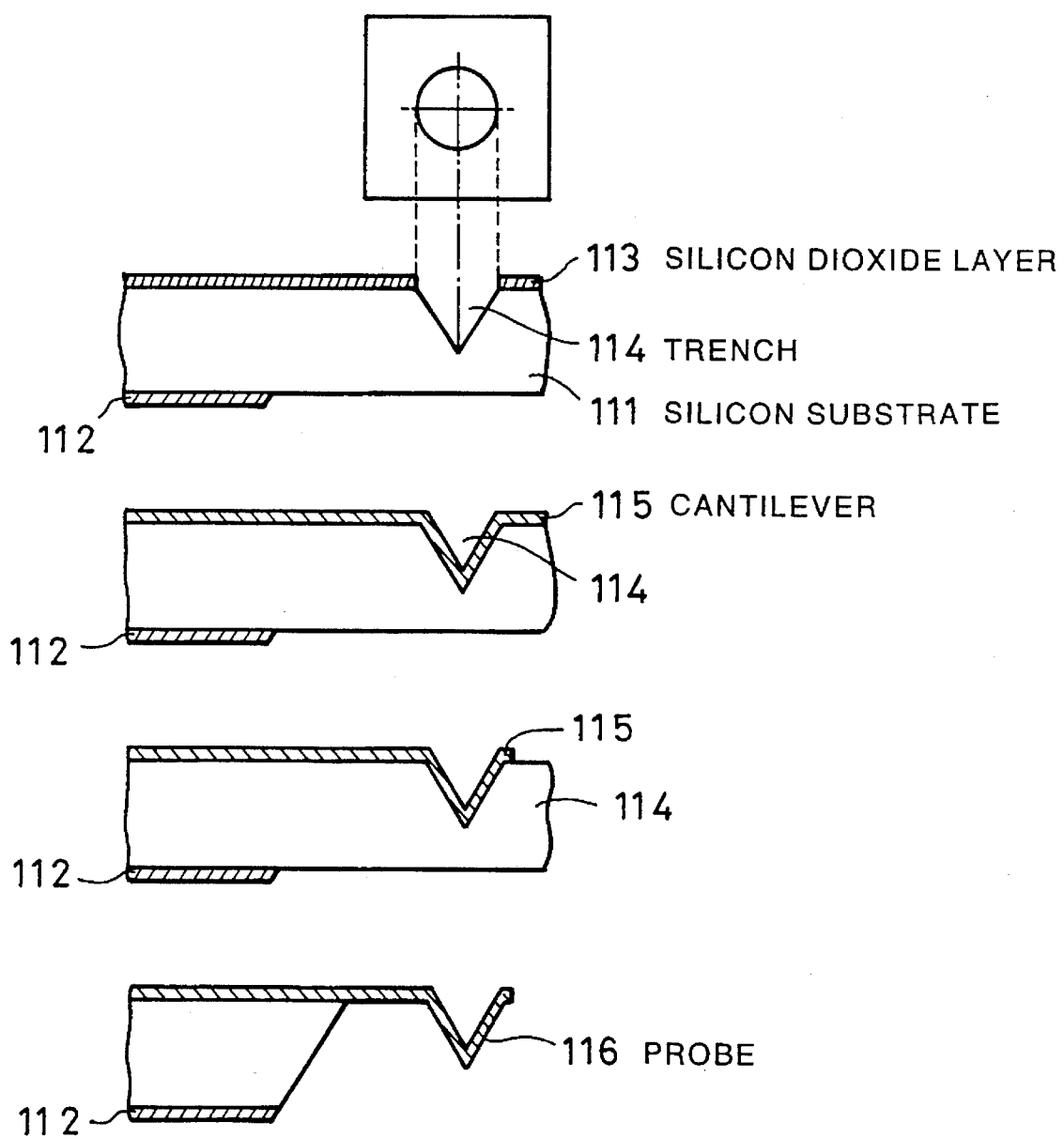
FIG. 15 illustrates the major processes of a conventional fine tip manufacturing method.
Figure 16A:
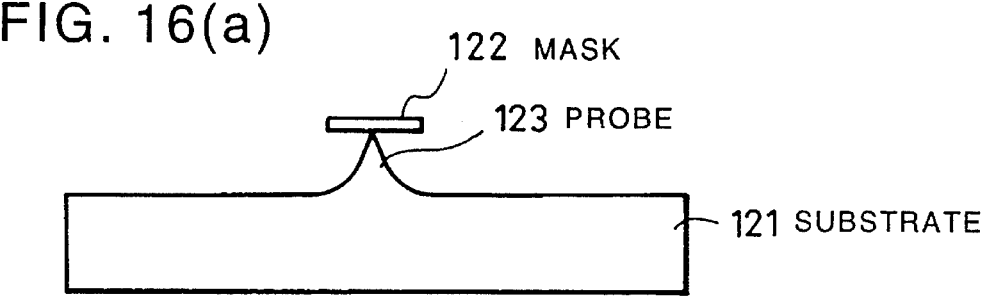
FIGS. 16(a) and 16(b) illustrate the manufacturing processes of a conventional fine tip.
Figure 16B:
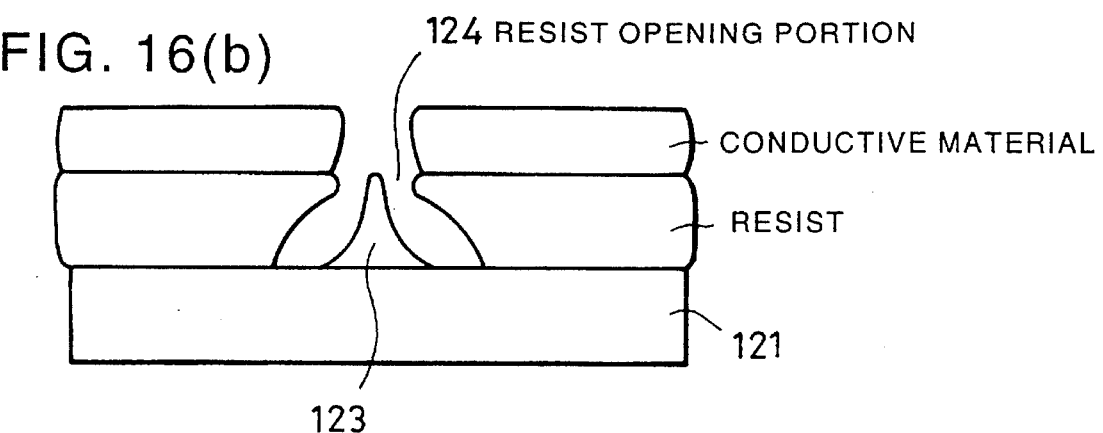

This is another example of the data processing apparatus which employs the plurality of cantilever type probe units provided in the second aspect of the present invention. This example is characterized in that the cantilever type probes are disposed two-dimensionally in order to increase the density of the probes. FIG. 13 illustrates the cantilever type probe unit used in the data processing apparatus of this example. FIG. 14 illustrates the layout of the recording medium substrate.

The manufacturing method is substantially the same as that of Example 7. However, the film forming conditions of the two piezoelectric layers 53a and 53b are changed from those of the manufacturing method of Example 7 so that the distal end of the cantilever can be turned downward. Furthermore, since a thinner substrate than that used in Example 7 is used, the distal end of the tunneling current tip 50 can be lowered further than the bottom surface of the substrate 51. In this example, the thickness of the silicon (100) substrate 51 used in the probe unit was 100 μm, the length of the cantilever was 1000 μm, and the thickness of the single ZnO layer was 5000Å.

The RF sputtering device was used to form the layers of ZnO. The target was ZnO, and the atmosphere was a mixture gas of $O_2$ and Ar. The gas pressure ratio between $O_2$ and Ar was 1:1. The total gas pressure of $O_2$+Ar used when the ZnO layer 53b was formed was 10 mtorr. The distal end of the cantilever 52 could be turned downward by 150 μm by controlling the gas pressures during the sputtering process so that the film stress of the lower ZnO layer 53a was closer to the tensile stress than the film stress of the upper ZnO layer 53b.

The block diagram of the data processing apparatus of this Example is the same as that of example 8. In this example, since the tips 50 were disposed two-dimensionally, recording and reproduction at a higher resolution and at a higher speed than those of Example 8 were enabled.

As will be understood from the foregoing description, in the fine tip manufacturing method provided in the first aspect of the present invention, since the first substrate in which the recessed portion is formed, i.e., the female die of the fine tip, can be used repeatedly, productivity can be improved and production costs reduced. Furthermore, a probe unit capable of detecting a tunneling current and of transmitting the obtained signal can readily be manufactured by forming an interconnection and a signal processing circuit element containing transistors beforehand on the second substrate. Furthermore, a probe unit capable of separately moving the fine tips toward or away from the surface of a sample or recording medium can readily be manufactured by using the second substrate in which the driving interconnections are formed on the cantilever having an actuator capable of uni-axial, bi-axial or tri-axial driving. Furthermore, since a metal fine tip material is used, an STM probe having excellent reproducibility and stable characteristics can be obtained.

In the probe unit manufacturing method provided in the second aspect of the present invention, a probe unit, having a plurality of fine tips having uniform shape as well as a displacement means, can be obtained by forming a fine probe for inputting or outputting data by forming a piezoelectric element as the displacement means. The fine probe can be formed by forming a recessed portion in the surface of a single crystal substrate by crystal axis anisotropic etching and then by depositing a conductive material on that recessed portion. Scanning tunneling microscopes and data processing apparatuses which employ such a probe unit are reliable and capable of high-speed processing.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structure and functions.

What is claimed is:

1. A method of manufacturing a fine tip for detecting a fine current or force, said method comprising at least the following steps of:

(a) forming a recessed portion in a surface of a first substrate;

(b) forming a peeling layer on said first substrate;

(c) laminating a fine tip material on said peeling layer;

(d) joining said fine tip on said peeling layer to a second substrate; and (e) performing a peeling on an interface between said peeling layer and said first substrate or between said peeling layer and said fine tip to transfer said fine tip onto said second substrate.

2. The fine tip manufacturing method according to claim 1, wherein said second substrate has a signal processing circuit element formed thereon.

3. The fine tip manufacturing method according to claim 1, wherein said first substrate is a single crystal substrate, and wherein said recessed portion is formed by crystal axis anisotropic etching.

4. The fine tip manufacturing method according to claim 2, wherein said first substrate is a single crystal substrate, and wherein said recessed portion is formed by crystal axis anisotropic etching.

5. The fine tip manufacturing method according to claim 1, wherein said fine tip material is a noble metal or a noble metal alloy.

6. The fine tip manufacturing method according to claim 2, wherein said fine tip material is a noble metal or a noble metal alloy.

7. The fine tip manufacturing method according to claim 3, wherein said fine tip material is a noble metal or a noble metal alloy.

8. A fine tip manufactured by the fine tip manufacturing method set forth in one of claims 1–7.

9. A method of manufacturing a probe unit comprising a lever including a fine tip for detecting a tunneling current or minute force, said method comprising the steps of:

(a) forming a recessed portion in a surface of a first substrate;

(b) forming a peeling layer on said first substrate;

(c) providing a fine tip material on said peeling layer;

(d) joining said fine tip on said peeling layer to a lever provided on a second substrate; and (e) performing a peeling on an interface between said peeling layer and said first substrate or between said peeling layer and said fine tip to transfer said fine tip onto said lever.

10. The method according to claim 9, wherein said second substrate has a signal processing circuit element formed thereon.

11. The method according to claim 9, wherein said first substrate is a single crystal substrate, and wherein said recessed portion is formed by crystal axis anisotropic etching.

12. The method according to claim 9, wherein said fine tip material is a noble metal or a noble metal alloy.

13. The method according to claim 12, wherein the noble metal is Au or Pt.

14. The method according to claim 9, wherein the peeling layer comprises Ag or Cr.

15. A probe unit manufactured by the probe unit manufacturing method set forth in claim 9.

16. A scanning tunneling microscope comprising:

(a) said probe unit set forth in claim 15;

(b) driving means for displacing said probe unit;

(c) control means for controlling said driving means;

(d) a sample;

(e) means for adjusting a distance between said tip in said probe unit and the sample; and (f) means for applying a voltage between said tip and the sample.

17. A data processing apparatus comprising:

(a) said probe unit set forth in claim 15;

(b) driving means for displacing said probe unit;

(c) control means for controlling said driving means;

(d) a recording medium;

(e) means for adjusting a distance between said tip and the recording medium; and (f) means for applying a voltage between said tip and the recording medium.

18. The data processing apparatus according to claim 17, wherein said voltage application means is a pulse voltage application means.

19. The data processing apparatus according to claim 17, wherein said voltage application means is a bias voltage application means.

20. The scanning tunneling microscope according to claim 16, wherein said control means changes a bias voltage which displaces said lever of said probe unit based on detection of a fine current which flows between the recording sample and said fine tip and applies a bias voltage signal to said lever.

21. The data processing apparatus according to claim 17, wherein said control means changes a bias voltage which displaces said lever of said probe unit based on detection of a fine current which flows between the recording medium and said fine tip and applies a bias voltage signal to said lever.

22. The data processing apparatus according to claim 17, wherein the recording medium has an electric memory effect.

23. The data processing apparatus according to claim 17, wherein the recording medium has a non-conductive surface.

* * * * *

UNITED STATES PATENT AND TRADEMARK OFFICE
CERTIFICATE OF CORRECTION

PATENT NO. : 5,546,375

DATED : August 13, 1996

INVENTORS : YASUHIRO SHIMADA ET AL.

It is certified that error appears in the above-identified patent and that said Letters Patent is hereby corrected as shown below:

ON THE TITLE PAGE, item

[57] ABSTRACT

Line 1, "portion 2" should read --portion--.

IN THE DRAWINGS

Sheet 11 of 16, FIG. 11. "SIRCUIT" should read --CIRCUIT--.

COLUMN 2

Line 37, "In" should read --in--.

COLUMN 3

Line 48, "above; described" should read --above-described--.

UNITED STATES PATENT AND TRADEMARK OFFICE
CERTIFICATE OF CORRECTION

PATENT NO. : 5,546,375

DATED : August 13, 1996

INVENTORS : YASUHIRO SHIMADA ET AL.

It is certified that error appears in the above-identified patent and that said Letters Patent is hereby corrected as shown below:

COLUMN 4

Line 45, "another" should read --other--.

COLUMN 6

Line 35, "hi-axial" should read --bi-axial--.

COLUMN 7

Line 49, "EXAMPLE" should read --EXAMPLES--.

COLUMN 10

Line 59, "p well" should read --P well--.

COLUMN 11

Line 21, "950 20 C." should read --950°C.--.

UNITED STATES PATENT AND TRADEMARK OFFICE
CERTIFICATE OF CORRECTION

PATENT NO. : 5,546,375

DATED : August 13, 1996

INVENTORS : YASUHIRO SHIMADA ET AL.

It is certified that error appears in the above-identified patent and that said Letters Patent is hereby corrected as shown below:

COLUMN 12

Line 19, "SiOn" should read --SiON--.

COLUMN 14

Line 21, "is" should read --are--;
Line 39, "X-y stage" should read --X-Y stage--.

COLUMN 17

Line 11, "one" should read --anyone--.

Signed and Sealed this

Fourteenth Day of January, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,546,375
DATED : August 13, 1996
INVENTOR(S) : YASUHIRO SHIMADA ET AL.

It is certified that error appears in the above-indentified patent and that said Letters Patent is hereby corrected as shown below:

Column 18,

IN THE CLAIMS

Claim 20, lines 4-5, change "recording sample" to --sample--.

Signed and Sealed this

First Day of April, 1997

Attest:

BRUCE LEHMAN

Attesting Officer     Commissioner of Patents and Trademarks